US011897224B2

(12) United States Patent
Iwasa et al.

(10) Patent No.: US 11,897,224 B2
(45) Date of Patent: Feb. 13, 2024

(54) BOX FORMING APPARATUS AND BOX FORMING AND PACKING SYSTEM

(71) Applicant: ISHIDA CO., LTD., Kyoto (JP)

(72) Inventors: Tatsuya Iwasa, Ritto (JP); Yoshinobu Shimomae, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 24 days.

(21) Appl. No.: 18/152,774

(22) Filed: Jan. 11, 2023

(65) Prior Publication Data

US 2023/0226792 A1 Jul. 20, 2023

(30) Foreign Application Priority Data

Jan. 14, 2022 (JP) ................................ 2022-004453

(51) Int. Cl.

| | |
|---|---|
| ***B31B 50/78*** | (2017.01) |
| ***B31B 50/00*** | (2017.01) |
| ***B31B 50/04*** | (2017.01) |
| *B31B 105/00* | (2017.01) |

(52) U.S. Cl.

CPC ............ *B31B 50/78* (2017.08); *B31B 50/003* (2017.08); *B31B 50/044* (2017.08); *B31B 2105/0022* (2017.08)

(58) Field of Classification Search

CPC .. B31B 1/78; B65B 5/02; B65B 43/18; B65B 43/26; B65B 35/44

USPC ................................ 493/309, 313, 315, 316

See application file for complete search history.

(56) References Cited

U.S. PATENT DOCUMENTS

| | | | | |
|---|---|---|---|---|
| 6,913,568 B2 * | 7/2005 | Frank | .................... | B31B 50/802 493/309 |
| 10,843,831 B2 * | 11/2020 | Webb | .................... | B65B 43/265 |
| 2016/0332761 A1 | 11/2016 | Yokota | | |

FOREIGN PATENT DOCUMENTS

| | | |
|---|---|---|
| JP | 2019-147582 A | 9/2019 |

OTHER PUBLICATIONS

YouTube Video, SWS Packaging, "Combi RCE Robotic Random Case Erector installed by SWS Packaging", accessible at https://www.youtube.com/watch?v=9-W9gfCtZhE, including associated bibliographic information Published online Aug. 13, 2017.

(Continued)

*Primary Examiner* — Jacob A Smith

(74) *Attorney, Agent, or Firm* — Shinjyu Global IP

(57) ABSTRACT

A box forming apparatus includes first holders configured to hold a first side surface of a cardboard sheet, second holders configured to hold a second side surface of the cardboard sheet, an arm, a first mover, and a second mover. The arm has a support that supports the first and the second holders. The first mover changes a position of the first holders relative to the second holders while the arm is being rotated to open the cardboard sheet. The second mover moves the arm in association with opening of the cardboard sheet so that, when the cardboard sheet has been opened, the second mover will have moved the support a predetermined distance in a second direction opposite a first direction, which is a direction heading from a rotational center of the arm to a distal end of the arm.

7 Claims, 13 Drawing Sheets

(56) References Cited

OTHER PUBLICATIONS

YouTube Video, Onexia Inc., "Robotic Case Erector and Case Packer | Universal Robots | Cobots | ONExia Inc.", accessible at https://www.youtube.com/watch?v=-CESiuu7CYs, including associated bibliographic information Published online Jul. 14, 2021.

The Search Report from the corresponding European Patent Application No. 23151589.1 dated Jun. 28, 2023.

* cited by examiner

BOX FORMING APPARATUS AND BOX FORMING AND PACKING SYSTEM

BACKGROUND

Technical Field

The present invention relates to a box forming apparatus and a box forming and packing system that includes the box forming apparatus.

Related Art

Conventionally, a box forming apparatus is known which, as in patent document 1 (JP-A No. 2019-147582), holds with a first holding unit and a second holding unit two side surfaces of a flat cardboard sheet and changes the position of the first holding unit relative to the second holding unit while moving an arm that supports the first holding unit and the second holding unit to open the cardboard sheet.

SUMMARY

Technical Problem

The box forming apparatus disclosed in patent document 1 (JP-A No. 2019-147582) has a problem that, in order to ensure space for the arm and the cardboard sheet held by the holding units to move when the arm is moved to open the cardboard sheet, the apparatus tends to increase in size in the moving direction of the arm.

It is an object of the present invention to provide a box forming apparatus that can inhibit an increase in apparatus size.

Solution to Problem

A box forming apparatus in accordance with a first aspect of the invention opens a collapsed cardboard sheet (i.e., a box preform in its flattened state) in which a first side surface and a second side surface oppose a third side surface and a fourth side surface to form a square tubular cardboard box in which the first side surface, the second side surface, the third side surface, and the fourth side surface are consecutive in this order. The box forming apparatus includes a first holder, a second holder, an arm, a first mover, and a second mover. The first holder is configured to hold the first side surface of the cardboard sheet. The second holder is configured to hold the second side surface of the cardboard sheet. The arm has a support configured to support the first holder and the second holder. The arm is configured to rotate about a rotational center. The first mover is configured to change a position of the first holder relative to the second holder while the arm is being rotated to open the cardboard sheet. The second mover is configured to move the support or the arm, in association with rotation of the arm to open the cardboard sheet, the support or the arm in a second direction opposite to a first direction. The second mover is configured to move the support or the arm, such that the support is moved in the second direction, when opening of the cardboard sheet is completed, by a predetermined distance relative to a position where the support would be disposed if the support or the arm were not moved by the second mover. The first direction is a direction heading from the rotational center of the arm to a distal end of the arm when the opening of the cardboard sheet is completed.

In the box forming apparatus of the first aspect, the second mover moves the support or the arm so that, at the point in time when the opening of the cardboard sheet is completed, the support has been moved in the second direction compared with a case where the second mover does not move the support or the arm. As a result, moving space for the arm and the cardboard sheet held by the holders can be ensured while reducing the length of the box forming apparatus in the first direction.

A box forming apparatus in accordance with a second aspect of the invention is the box forming apparatus of the first aspect, wherein the second mover is configured to move the rotational center of the arm in the second direction.

In the box forming apparatus of the second aspect, the rotational center of the arm is moved in the second direction in a case where rotating the arm to open the cardboard sheet. For that reason, with a relatively simple structure, moving space for the arm and the cardboard sheet held by the holders can be ensured while reducing the length of the box forming apparatus in the first direction.

A box forming apparatus in accordance with a third aspect of the invention is the box forming apparatus of the first aspect, wherein the second mover is configured to move the support in the second direction.

In the box forming apparatus of the third aspect, the support is moved in the second direction in a case where rotating the arm to open the cardboard sheet. Therefore, moving space for the cardboard sheet held by the holders can be ensured while reducing the length of the box forming apparatus in the first direction.

A box forming apparatus in accordance with a fourth aspect of the invention is the box forming apparatus of any of the first aspect to the third aspect, wherein the first mover has an actuator configured to rotate the arm and a linkage configured to change the position of the first holder relative to the second holder in accompaniment with a rotation of the arm.

In the box forming apparatus of the fourth aspect, the position of the first holder relative to the second holder is changed by the linkage in conjunction with the rotation of the arm. Therefore, the rotation of the arm and the changing of the position of the first holder relative to the second holder can be realized with a single actuator.

Furthermore, in the box forming apparatus of the fourth aspect, the timing of the rotation of the arm and the timing of the changing of the position of the first holder relative to the second holder can be synchronized. Therefore, the occurrence of deformation and damage in the cardboard box that the box forming apparatus opens can be inhibited.

A box forming apparatus in accordance with a fifth aspect is the box forming apparatus of any of the first aspect to the fourth aspect, further includes a storage area and a supplier. The storage area is configured to store a supply of the cardboard sheets. The supplier is configured to supply each of the cardboard sheet in the storage area to a supply position. The storage area has a positioner configured to adjust a storage position of the cardboard sheet.

In the box forming apparatus of the fifth aspect, the storage position of the cardboard sheet is adjustable. For that reason, in the box forming apparatus of the fifth aspect, the cardboard sheet can be supplied to the supply position so that the position of the boundary between the first side surface and the second side surface (in other words, the position at which the cardboard sheet is bent) is always in the same position even when the size of the cardboard sheet changes. For that reason, in the box forming apparatus of the fifth aspect, even when the size of the cardboard sheet changes, it is not necessary to adjust the positions of various constituent parts in mechanisms for box forming, and operability is therefore good. Furthermore, a configuration or structure for adjusting the positions of various constituent parts in mechanisms for box forming, which are constituently complex, is not required, so an increase in the cost of the box forming apparatus can also be inhibited.

A box forming apparatus in accordance with a sixth aspect of the invention is the box forming apparatus of any of the first aspect to the fifth aspect, further includes a changer configured to change the predetermined distance (the moving amount of the support).

In a case where the size of the cardboard sheet (the cardboard box) that is opened by the box forming apparatus is relatively small, sometimes the cardboard sheet held by the holders does not stick out much in the first direction even when the arm is rotated in a case where the opening of the cardboard sheet. Additionally, sometimes the cardboard sheet that has been opened by the box forming apparatus is handed over to a downstream process by being moved in the first direction after having passed through a predetermined process. In such a condition, when the support of the arm is moved a large amount in the second direction, the amount of time required to hand over the cardboard box to the downstream process runs the risk of becoming unnecessarily long.

By contrast, in the box forming apparatus of the sixth aspect, the occurrence of a situation where the support of the arm is moved in the second direction an unnecessarily large amount can be inhibited.

A box forming and packing system in accordance with a seventh aspect of the invention includes the box forming apparatus of any of the first aspect to the sixth aspect, a forming device, and a packing apparatus. The forming device forms a bottom lid in the cardboard box that has been opened by the box forming apparatus. The packing apparatus is configured to pack goods in the cardboard box in which the bottom lid has been formed.

In the box forming and packing system of the seventh aspect, an increase in the size of the box forming apparatus can be inhibited, so an increase in the size of the box forming and packing system overall can be inhibited.

Advantageous Effects of Invention

In the box forming apparatus in accordance with the present invention, moving space for the cardboard sheet held by the holding units can be ensured while reducing the length of the box forming apparatus in the first direction (the direction heading from the rotational center of the arm to the distal end of the arm at the point in time when the opening of the cardboard box is completed).

Furthermore, in the box forming and packing system in accordance with the present invention, an increase in the size of the box forming apparatus can be inhibited, so an increase in the size of the box forming and packing system overall can be inhibited.

DETAILED DESCRIPTION

Figure 1:
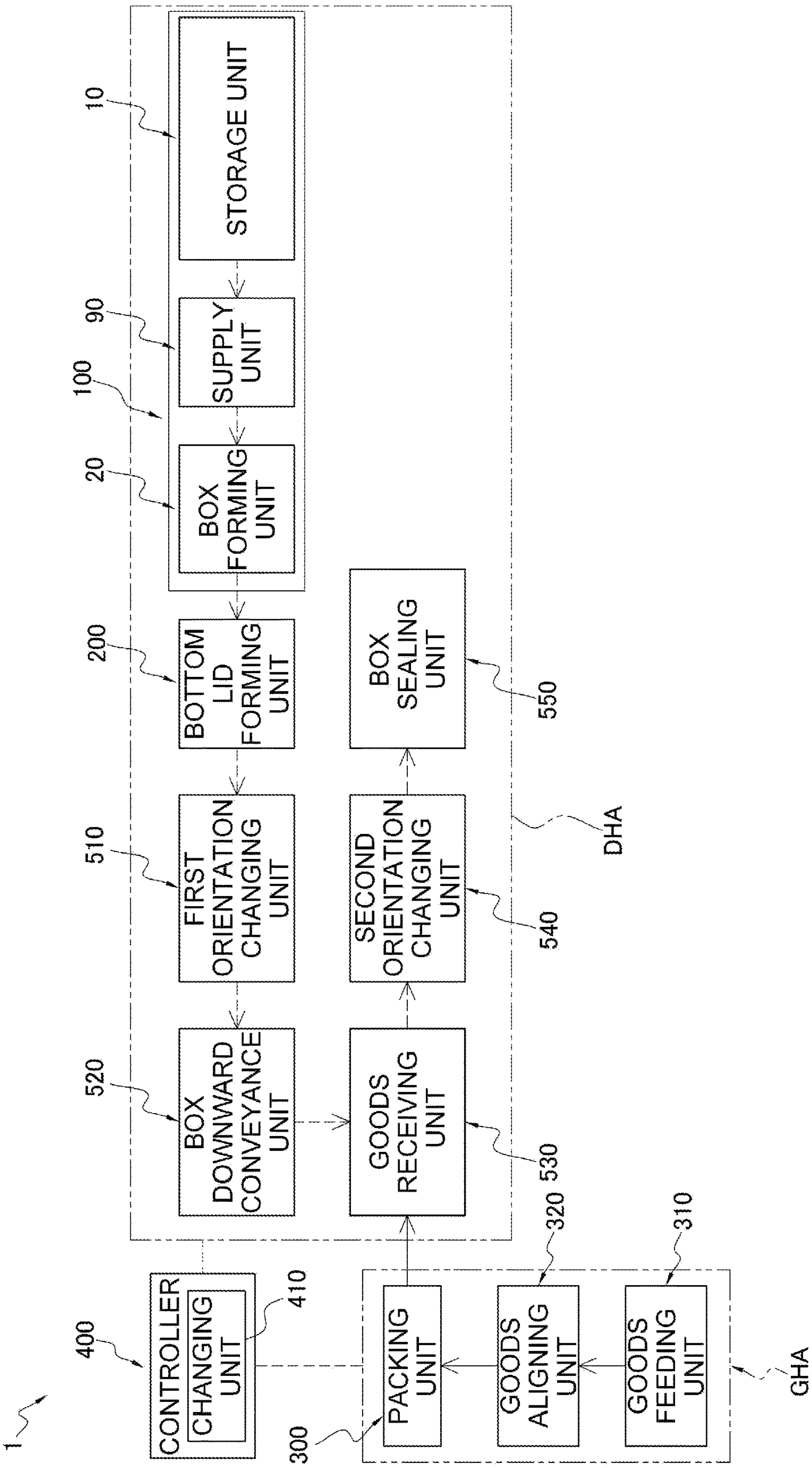
FIG. 1 is a block diagram of a box forming and packaging system pertaining to an embodiment of the invention, which has a box forming apparatus in accordance with the invention.

An embodiment of the invention will be described below with reference to the drawings. It will be noted that the following embodiment is a specific example of the invention and is not intended to limit the technical scope of the invention.

In the following description, expressions such as “upper,” “lower,” “left,” “right,” “front,” and “rear” are sometimes used for convenience of description to describe positions and directions. Unless otherwise specified, these expressions follow the directions of the arrows in the drawings. It will be noted that the expressions indicating positions and directions used below are not intended to limit the technical scope of the invention.

(1) Overall Configuration of Box Forming and Packing System

Figure 2:
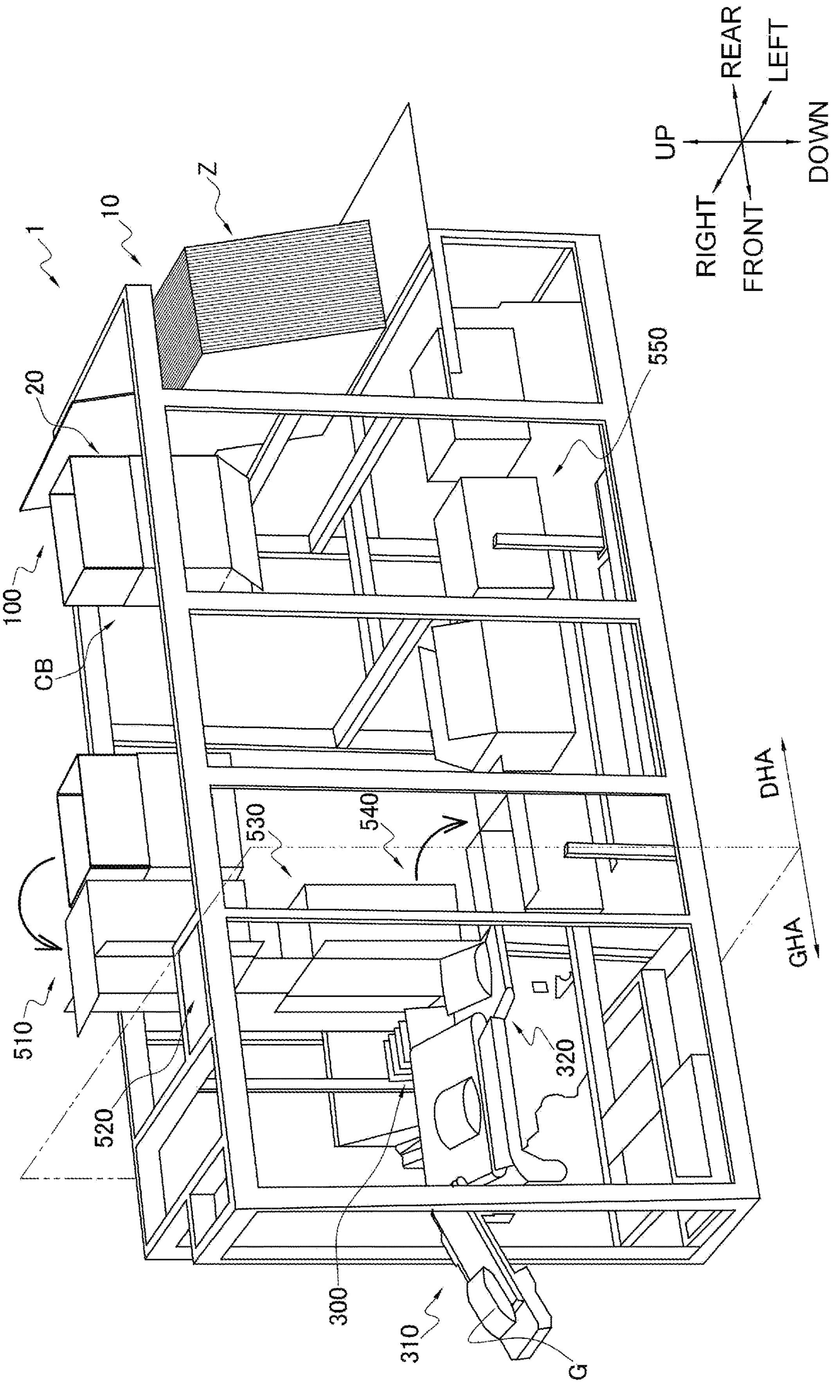
FIG. 2 is a perspective view showing the configuration of the box forming and packing system of FIG. 1.
Figure 3:
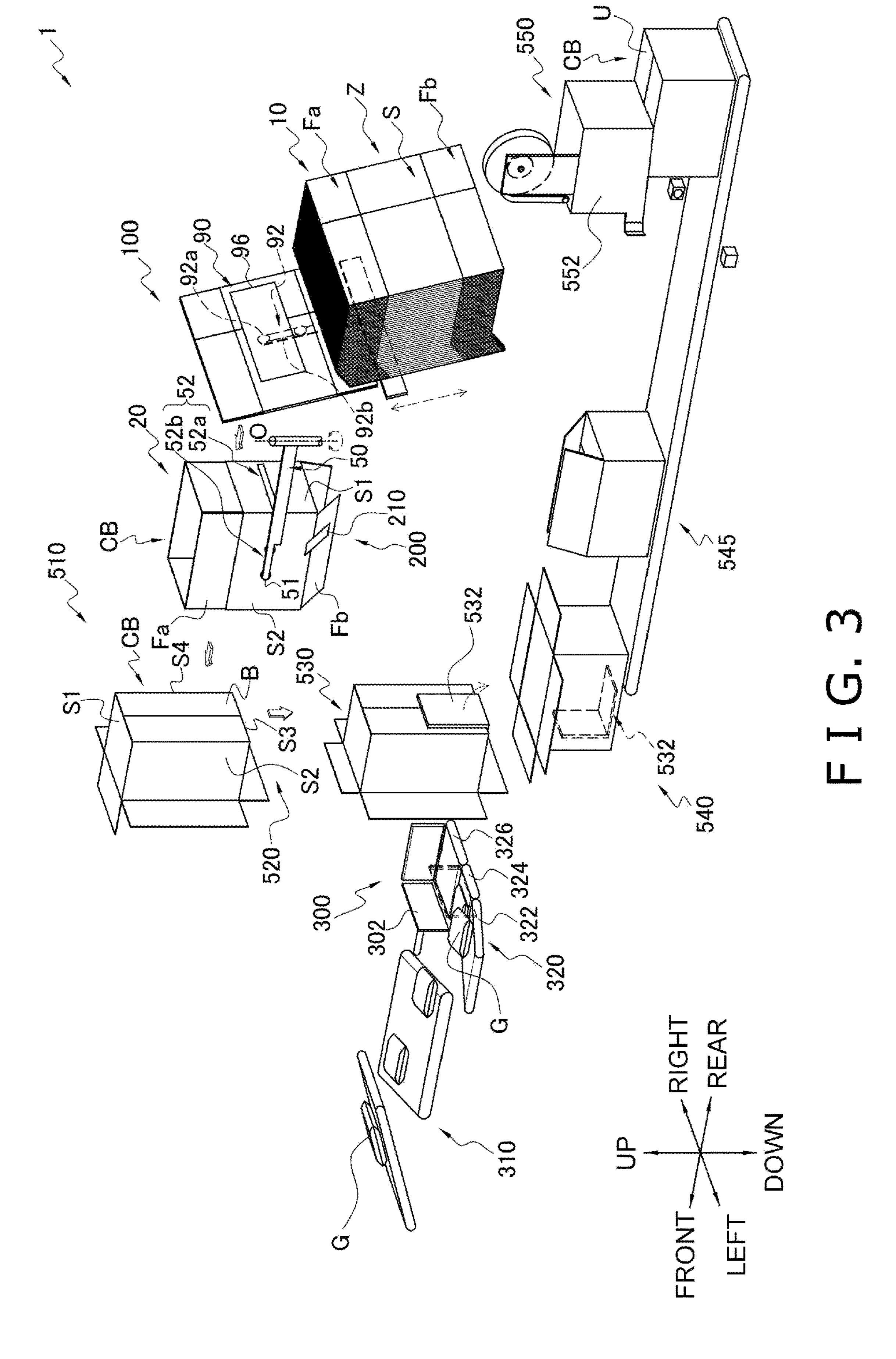
FIG. 3 is a perspective view showing the movement of cardboard sheets, cardboard boxes, and goods in the box forming and packing system of FIG. 1.

A box forming and packing system 1 in accordance with an embodiment of the invention will now be described with reference to FIG. 1 to FIG. 3. FIG. 1 is a block diagram of the box forming and packing system 1. FIG. 2 is a perspective view showing the configuration of the box forming and packing system 1. FIG. 3 is a perspective view showing a flow of cardboard sheets Z, cardboard boxes CB, and goods Gin the box forming and packing system 1.

The box forming and packing system 1 is a system that opens a collapsed cardboard sheet Z (i.e., a box preform in its flattened state) to form a square tubular cardboard box CB, forms a bottom lid B in the cardboard box CB, and packs goods G in the cardboard box CB in which the bottom lid B has been formed. Although this is not intended to be limiting, the goods G are, for example, bags containing a snack food.

The box forming and packing system 1, as shown in FIG. 1 and FIG. 2, has a cardboard handling area DHA and a goods handling area GHA. In the box forming and packing system 1, the cardboard handling area DHA and the goods handling area GHA are interconnected in a state in which they are mutually independently separable.

In the cardboard handling area DHA, formation of the cardboard box CB and formation of the bottom lid B in the cardboard box CB are performed. Furthermore, in the cardboard handling area DHA, formation of an upper lid U in the cardboard box CB is performed after the goods G have been packed in the cardboard box CB.

In the goods handling area GHA, alignment of the goods G, which are supplied from an apparatus (not shown in the drawings) for manufacturing the goods G, is performed. The aligned goods G are packed in the cardboard box CB in which the bottom lid B has been formed.

In the cardboard handling area DHA, a box forming apparatus 100, a bottom lid forming unit 200, a first orientation changing unit 510, a box downward conveyance unit 520, a goods receiving unit 530, a second orientation changing unit 540, and a box sealing unit 550 are mainly disposed (see FIG. 1). In the goods handling area GHA, a goods feeding unit 310, a goods aligning unit 320, and a packing unit 300 are mainly disposed (see FIG. 1).

The various devices in the cardboard handling area DHA and the various devices in the goods handling area GHA are electrically connected to a controller 400 that controls these devices (see FIG. 1).

(2) Details of Box forming and Packing System

(2-1) Configuration of Cardboard Handling Area

(2-1-1) Box Forming Apparatus

The box forming apparatus 100 mainly has a storage unit (storage) 10, a supply unit (supplier) 90, and a box forming unit 20 (see FIG. 1). The box forming apparatus 100 is an apparatus that opens the collapsed cardboard sheet Z to form the square tubular cardboard box CB.

The storage unit 10 accommodates the cardboard box CB before it is opened, in other words, the cardboard sheet Z.

It will be noted that the cardboard box CB has four side surfaces S (a first side surface 51, a second side surface S2, a third side surface S3, and a fourth side surface S4). In the cardboard box CB, the first side surface 51, the second side surface S2, the third side surface S3, and the fourth side surface S4 are consecutive in this order. When the box forming apparatus 100 opens the cardboard sheet Z, the square tubular cardboard box CB in which the four side surfaces S are consecutive is formed (see FIG. 10). Furthermore, the cardboard box CB has flaps Fa that extend from each of the first side surface 51, the second side surface S2, the third side surface S3, and the fourth side surface S4 and are used to form the upper lid U of the cardboard box CB (see FIG. 3). The cardboard box CB also has flaps Fb that extend in the opposite direction of the flaps Fa from each of the first side surface 51, the second side surface S2, the third side surface S3, and the fourth side surface S4 and are used to form the bottom lid B of the cardboard box CB (see FIG. 3). In the cardboard sheet Z, the first side surface 51 and the second side surface S2 oppose the third side surface S3 and the fourth side surface S4 (see FIG. 7).

The supply unit 90 supplies to a supply position the cardboard sheet Z placed in the storage unit 10. The supply position is a position at which the box forming unit 20 receives the cardboard sheet Z supplied by the supply unit 90.

The box forming unit 20 opens the collapsed cardboard box CB, in other words, the collapsed cardboard sheet Z, to form the square tubular cardboard box CB.

Details about the box forming apparatus 100 will be described later.

(2-1-2) Bottom Lid Forming Unit

The bottom lid forming unit 200 is an example of a forming device.

The bottom lid forming unit 200 has folding members 210 (see FIG. 3).

The bottom lid forming unit 200 drives, with a drive unit such as an air cylinder or a motor (not shown in the drawings), the folding members 210 (see FIG. 3) to thereby bring the folding members 210 into contact with the flaps Fb of the cardboard box CB formed by the box forming apparatus 100 and fold the flaps Fb. For example, the bottom lid forming unit 200 folds the flaps Fb extending from the first side surface 51 and the third side surface S3 and thereafter folds the flaps Fb extending from the second side surface S2 and the fourth side surface S4. Moreover, the bottom lid forming unit 200 applies, with a tape application mechanism (not shown in the drawings), tape to the flaps Fb that have been folded by the folding members 210 to form the bottom lid B.

It will be noted that the method by which the bottom lid forming unit 200 forms the bottom lid B is exemplary and is not limited to the above method. For example, the bottom lid forming unit 200 may also form the bottom lid B without using tape by quarter-folding the flaps Fb.

(2-1-3) First Orientation Changing Unit

The first orientation changing unit 510 rotates the cardboard box CB, in which the bottom lid B has been formed and an opening not closed by the flaps Fa (hereinafter, simply called "the opening") faces upward, 90° so that the opening faces forward. Specifically, the first orientation changing unit 510 rotates the cardboard box CB 90° about a horizontal axis extending in the left and right direction to change the orientation of the cardboard box CB so that the side surface S3 faces downward and the opening faces forward.

(2-1-4) Box Downward Conveyance Unit

The box downward conveyance unit 520 conveys downward the cardboard box B, which is in a first orientation in which the opening faces forward. For example, the box downward conveyance unit 520 conveys downward the cardboard box CB in the first orientation by dropping it.

(2-1-5) Goods Receiving Unit

The goods receiving unit 530 includes a holding member 532 that holds the third side surface S3 and the bottom lid B of the cardboard box CB. The goods receiving unit 530 receives the cardboard box CB in the first orientation conveyed thereto by the box downward conveyance unit 520 with the holding member 532, and holds them with the holding member 532. The holding member 532 holds the cardboard box CB in a state in which the opening of the cardboard box CB faces a push-in plate 302 (described later) of the packing unit 300 in the goods handling area GHA (see FIG. 2).

(2-1-6) Second Orientation Changing Unit

The second orientation changing unit 540 changes the orientation of the cardboard box CB in which the goods G have been packed in the goods receiving unit 530 to an orientation in which the opening faces upward. Specifically, the second orientation changing unit 540 rotates the holding member 532 about a rotational axis extending in the left and right direction to thereby rotate the cardboard box CB, whose third side surface S3 is facing downward and whose opening is facing forward, so that the third side surface S3 faces forward and the opening faces upward. The holding member 532 is, for example, driven by an air cylinder (not shown in the drawings). The cardboard box CB whose orientation has been changed by the second orientation changing unit 540 is conveyed rearward by a conveyor 545.

(2-1-7) Box Sealing Unit

As shown in FIG. 3, the box sealing unit 550 uses members (not shown in the drawings) to fold the flaps Fa of the cardboard box CB conveyed by the conveyor 545 and uses a tape applicator 552 to apply tape to the folded flaps Fa to form the upper lid U.

(2-2) Configuration of Goods Handling Area

In the flow of the goods G, a weighing apparatus, a bag making and packaging machine, and a goods inspection apparatus (not shown in the drawings) are disposed upstream of the box forming and packing system 1. In the flow of the goods G, the goods G that have been manufactured and passed inspections upstream of the box forming and packing system 1 are supplied to the box forming and packing system 1.

(2-2-1) Goods Feeding Unit

The goods feeding unit 310 receives a supply of the goods G conveyed thereto by a conveyor (not shown in the drawings) from upstream of the box forming and packing system 1 and conveys the received goods G to the goods aligning unit 320.

(2-2-2) Goods Aligning Unit

The goods aligning unit 320 includes plural conveyors 322, 324, 326. The goods aligning unit 320 uses the plural conveyors 322, 324, 326 to convey, while collecting, the goods G to a predetermined position (in back of the push-in plate 302 of the packing unit 300).

(2-2-3) Packing Unit

The packing unit 300 is an example of a packing apparatus.

The packing unit 300 mainly has the push-in plate 302.

The packing unit 300 packs, in the cardboard box CB in which the bottom lid B has been formed and which is being held by the goods receiving unit 530, the goods G conveyed thereto by the goods aligning unit 320. Specifically, the packing unit 300 uses a drive unit (e.g., an air cylinder or a motor not shown in the drawings) to move the push-in plate 302 rearward to thereby push the goods G that have been conveyed to the back of the push-in plate 302 into the cardboard box CB being held by the goods receiving unit 530 through the opening of the cardboard box CB.

(2-3) Controller

The controller 400 is a control device that mainly includes a CPU, a storage device including a ROM, a RAM, and an auxiliary storage device (e.g., flash memory), and an input/output interface. The controller 400 controls the operations of the various devices of the box forming and packing system 1 as a result of the CPU executing programs stored in the storage device. It will be noted that the controller 400 need not have all its functions realized by software and may have some of its functions realized by hardware such as a logic circuit. Furthermore, the controller 400 may be realized by one device or may be realized by plural devices.

The controller 400 is electrically connected to the various devices in the cardboard handling area DHA and the various devices in the goods handling area GHA. By executing the programs stored in the storage device, the controller 400 controls the operations of the various devices so that these devices execute predetermined operations at predetermined timings.

In the description of the mode for implementing the invention, sometimes expressions such as "drive mechanism or the like operates" are used. These statements mean that a drive mechanism or the like operates as a result of the controller 400 controlling the operation of the drive mechanism or the like.

(3) Details of Box Forming Apparatus

The box forming apparatus 100 will now be described in greater detail with reference to FIG. 4 to FIG. 10 in addition to FIG. 1 to FIG. 3.

Figure 4A:
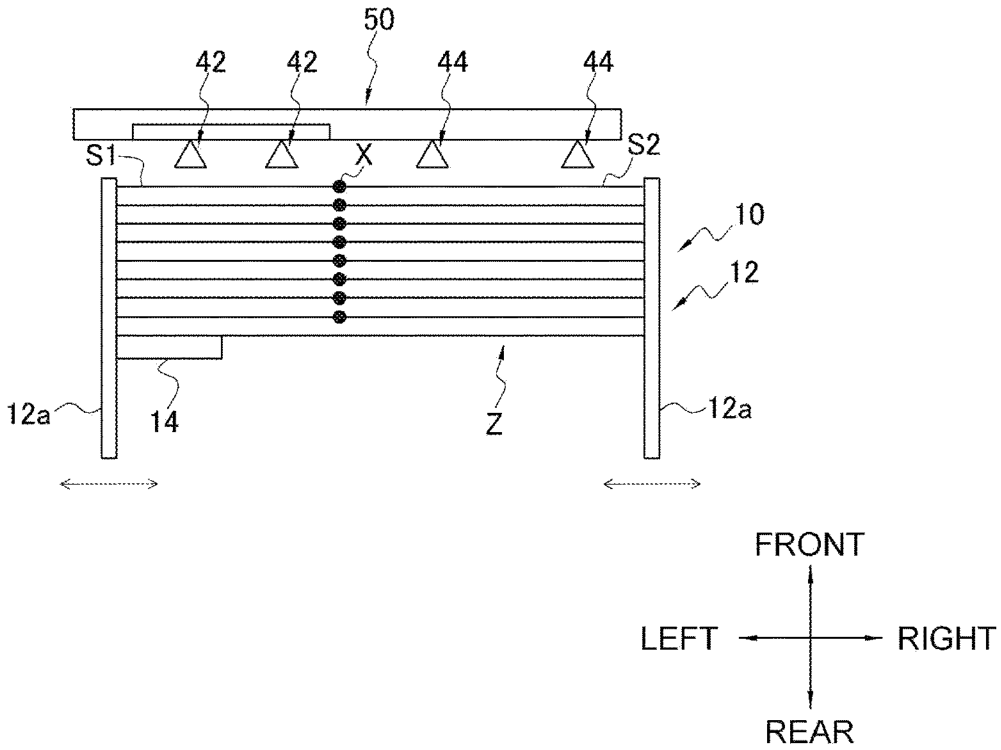
FIG. 4A is a schematic plan view of a storage unit of the box forming apparatus of FIG. 1.
Figure 4B:
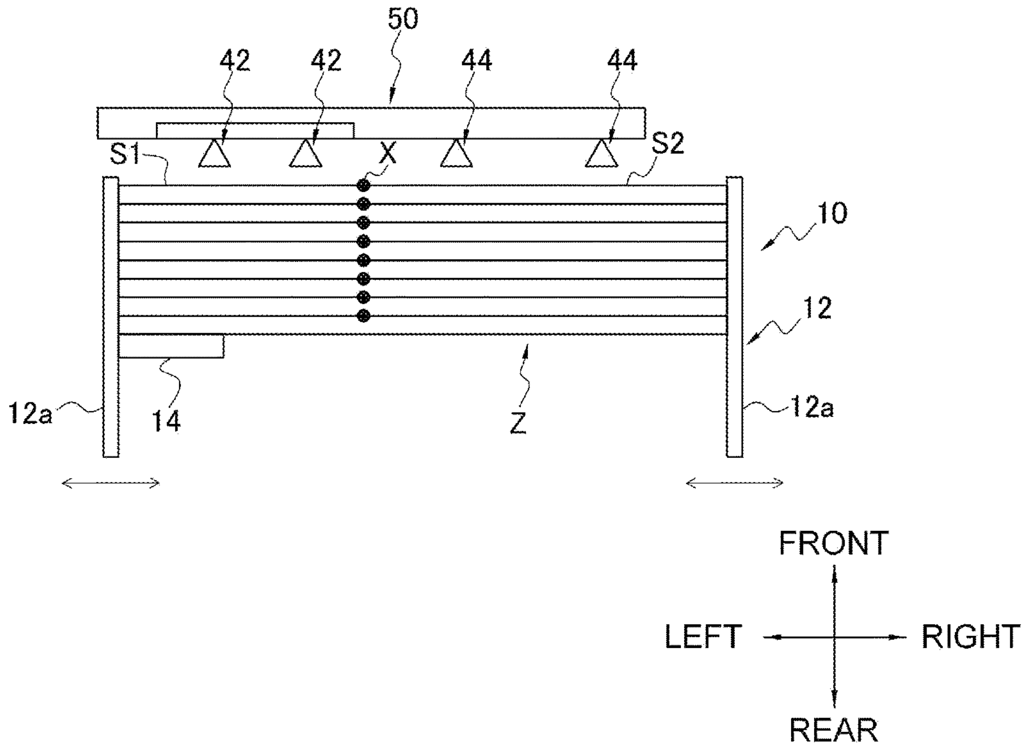
FIG. 4B is a schematic plan view of the storage unit of the box forming apparatus of FIG. 1 and shows the storage unit accommodating cardboard sheets of a different size from those in FIG. 4A.
Figure 5:
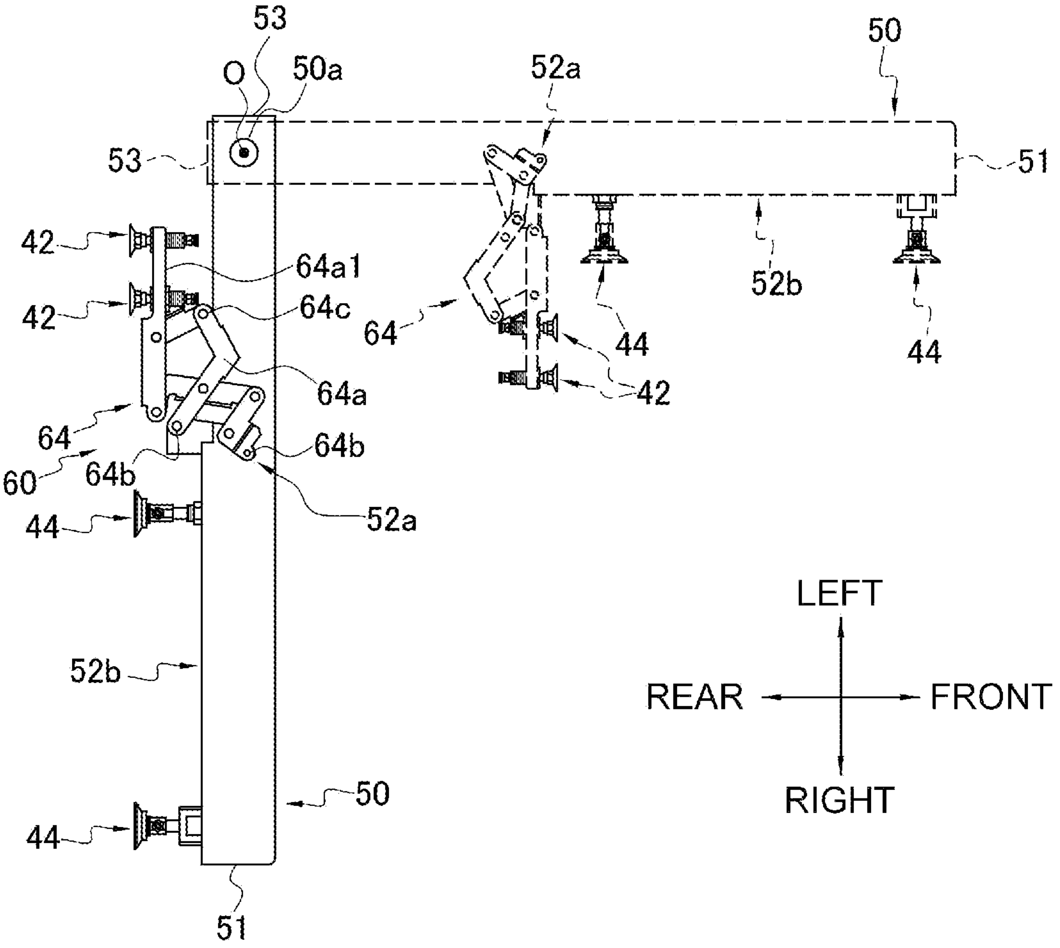
FIG. 5 is a schematic plan view of main portions of a box forming unit of the box forming apparatus of FIG. 1.
Figure 6:
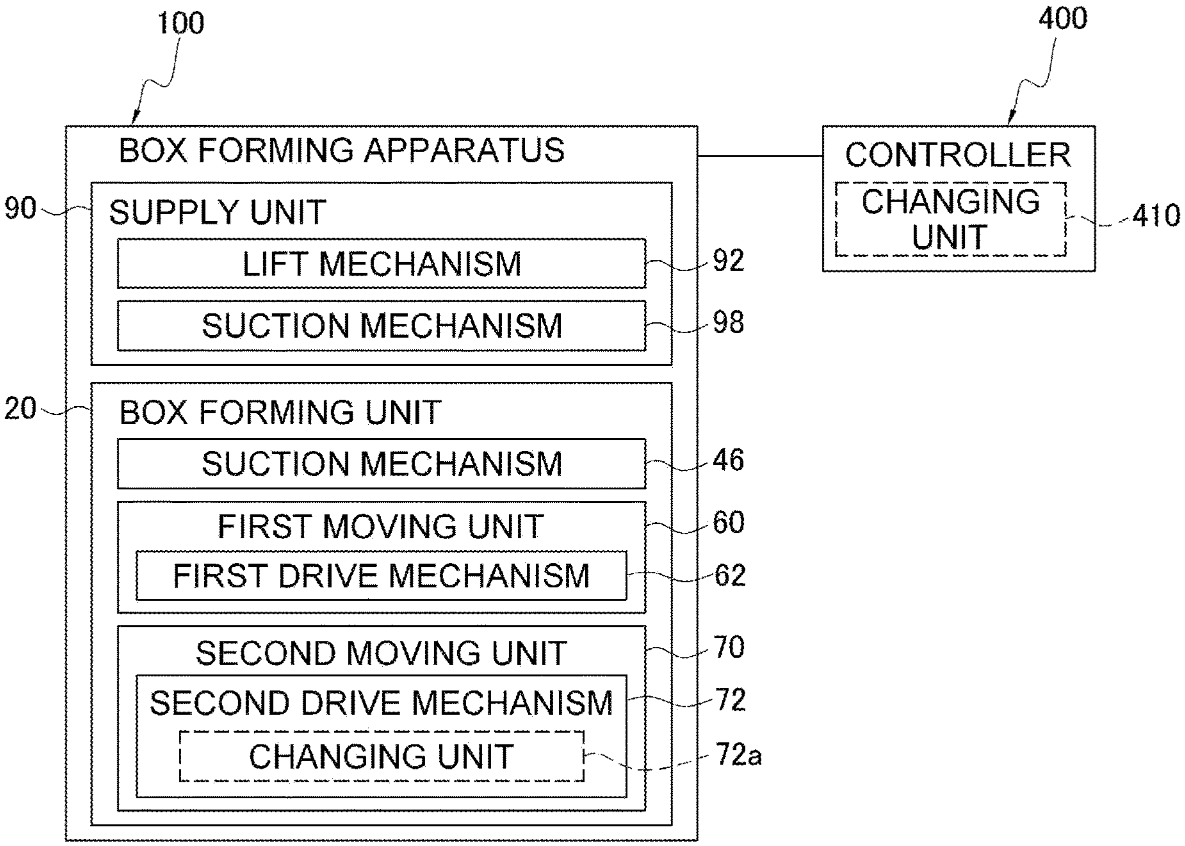
FIG. 6 is a block diagram of the box forming apparatus of FIG. 1.
Figure 7:
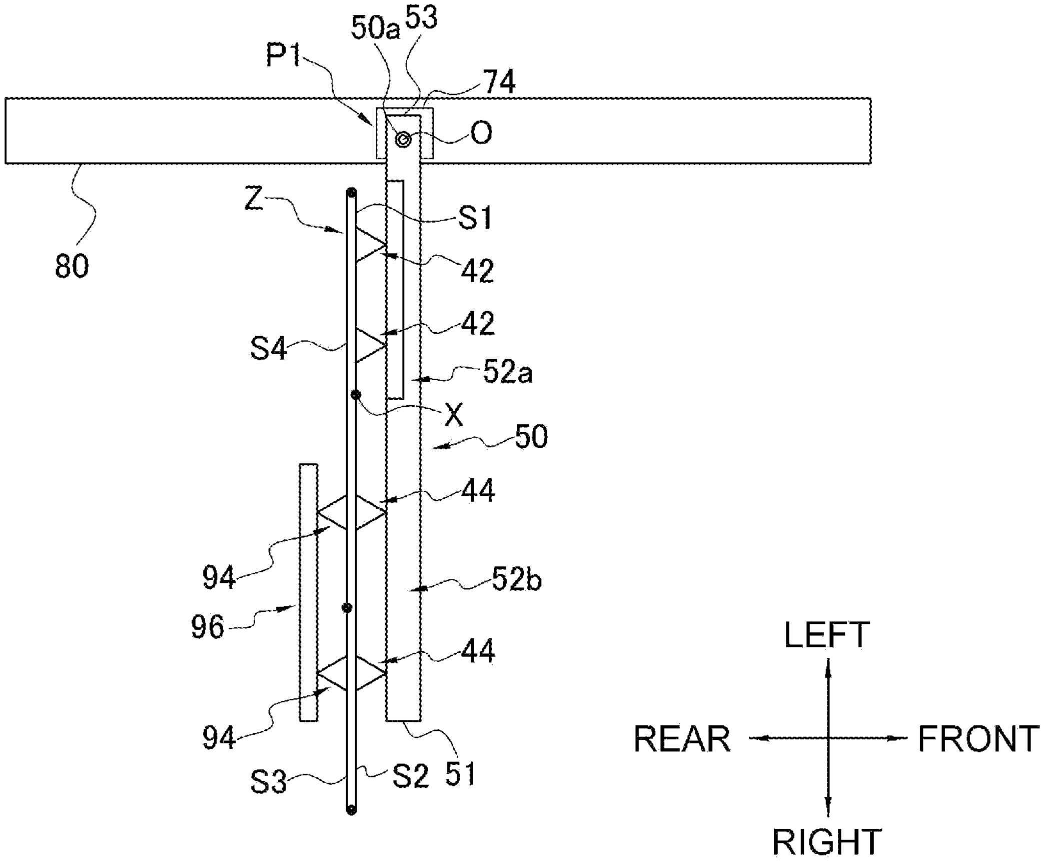
FIG. 7 is a schematic plan view of main portions of the box forming apparatus for describing an operation of opening the cardboard sheet performed by the box forming apparatus of FIG. 1, and shows a state before the opening of the cardboard sheet is started.
Figure 8:
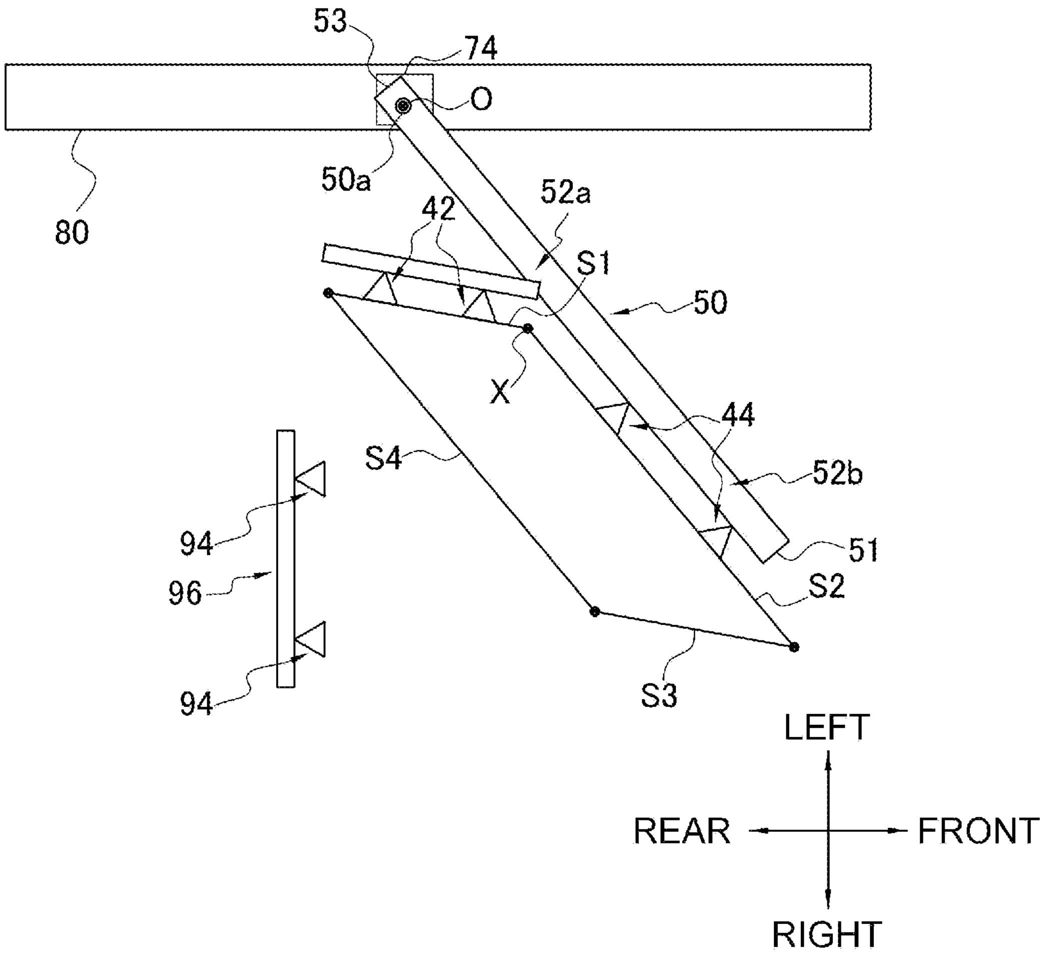
FIG. 8 is a schematic plan view of main portions of the box forming apparatus for describing the operation of opening the cardboard sheet performed by the box forming apparatus of FIG. 1, and shows a state in the middle of the operation of opening the cardboard sheet.
Figure 9:
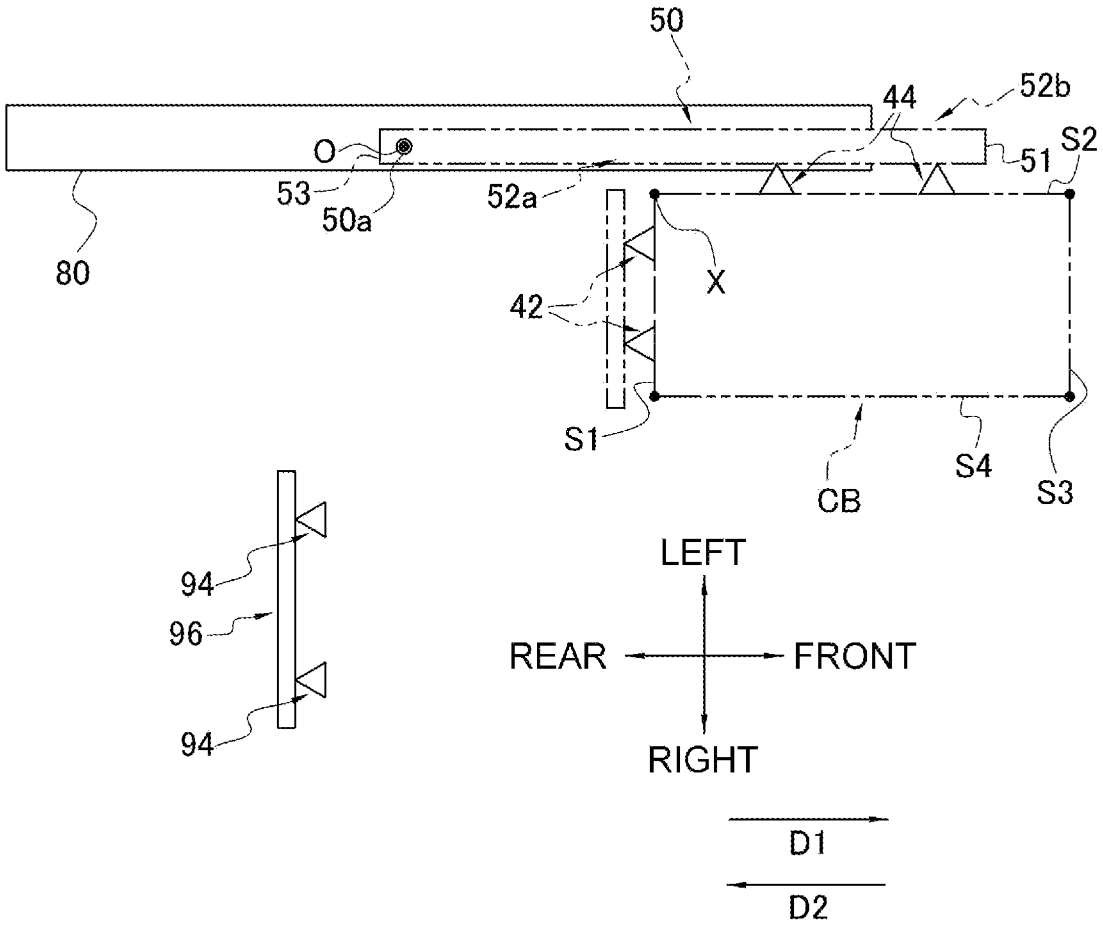
FIG. 9 is a schematic plan view showing the state of main portions of the box forming apparatus when the opening of the cardboard sheet is completed, in a case where it is assumed that a second moving unit is not provided to the box forming apparatus of FIG. 1.
Figure 10:
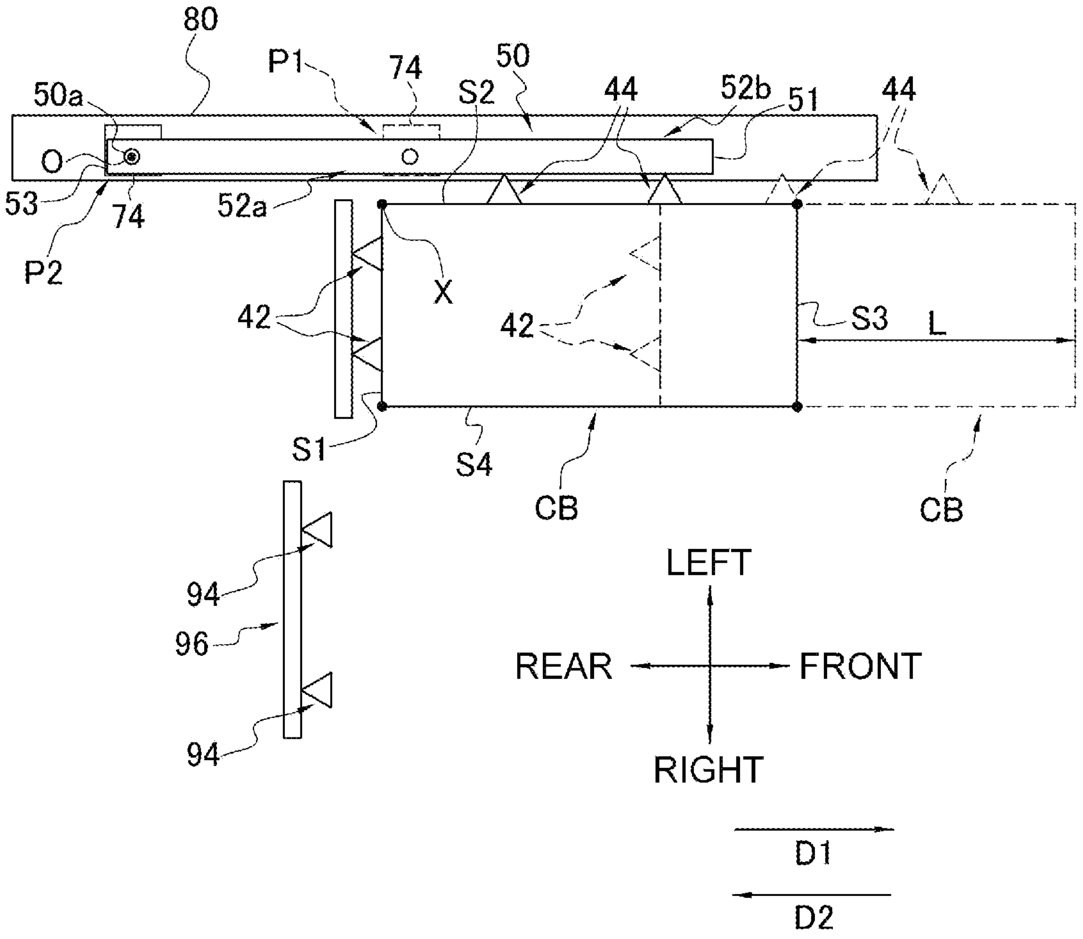
FIG. 10 is a schematic plan view of main portions of the box forming apparatus for describing the operation of opening the cardboard sheet performed by the box forming apparatus of FIG. 1, and shows the state of the box forming unit when the opening of the cardboard sheet is completed.

FIG. 4A and FIG. 4B are schematic plan views of the storage unit 10. It will be noted that the sizes of the cardboard sheets Z accommodated in the storage unit 10 differ between FIG. 4A and FIG. 4B. FIG. 5 is a schematic plan view of main portions of the box forming unit 20. FIG. 6 is a block diagram of the box forming apparatus 100. It will be noted that the controller 400 shown in FIG. 6 controls the operations of the various devices in the cardboard handling area DHA and the various devices in the goods handling area GHA as mentioned above. However, below, description about the control of the controller 400 to other than the box forming apparatus 100 will be omitted. FIG. 7 is a schematic plan view of main portions of the box forming apparatus 100 for describing the operation of opening the cardboard sheet Z performed by the box forming apparatus 100, and shows a state before the opening of the cardboard sheet Z is started. FIG. 8 is a schematic plan view of main portions of the box forming apparatus 100 for describing the operation of opening the cardboard sheet Z performed by the box forming apparatus 100, and shows a state in the middle of the operation of opening the cardboard sheet Z. FIG. 9 is a schematic plan view showing the state of main portions of the box forming apparatus 100 when the opening of the cardboard sheet Z is completed, in a case where it is assumed that a second moving unit 70 is not provided to the box forming apparatus 100. FIG. 10 is a schematic plan view of main portions of the box forming apparatus 100 for describing the operation of opening the cardboard sheet Z performed by the box forming apparatus 100, and shows a state in which the opening of the cardboard sheet Z is completed. It will be noted that, in FIG. 7 to FIG. 10, illustration of a linkage 64 of a first moving unit 60 described later is omitted.

(3-1) Storage Unit

The storage unit 10 accommodates the cardboard sheet Z.

The storage unit 10 accommodates a plurality of the cardboard sheets Z arranged side by side (i.e., stacked) along the front and rear direction. Specifically, in the storage unit 10, as shown in FIG. 3, the plural cardboard sheets Z are stored leaning against one another so that the side surfaces S and the flaps Fa, Fb of the cardboard sheets Z contact the side surfaces S and the flaps Fa, Fb of adjacent cardboard sheets Z in front and in back. Furthermore, in the storage unit 10, as shown in FIG. 3, the cardboard sheets Z are stored so that the flaps Fa are disposed on top and the flaps Fb are disposed on bottom. Furthermore, in the storage unit 10, the cardboard sheets Z are stored so that the first side surfaces 51 and the second side surfaces S2 are disposed in front and the third side surfaces S4 and the fourth side surfaces S4 are disposed in back. Furthermore, in the storage unit 10, the cardboard sheets Z are stored so that the first side surfaces 51 are disposed on the left side of the second side surfaces S2 and the third side surfaces S3 are disposed on the right side of the fourth side surfaces S4.

The cardboard sheets Z placed in the storage unit 10 are sequentially fed upward by the supply unit 90 one sheet at a time beginning with the foremost cardboard sheet Z, and are supplied to the box forming unit 20.

It will be noted that, as shown in FIG. 4A and FIG. 4B, a push member 14 contacts the rearmost cardboard sheet Z among the cardboard sheets Z placed in the storage unit 10. The push member 14 is energized by an elastic member such as a spring to cause a forward force to act on the rearmost cardboard sheet Z. Furthermore, the cardboard sheets Z in the storage unit 10 are placed on a conveyor (not shown in the drawings) that conveys the cardboard sheets Z forward. Due to the movement of the conveyor and the push member 14, when the supply unit 90 feeds the foremost cardboard sheet Z upward, the cardboard sheet Z that had been adjacent to it (that had been disposed second from the front) moves to a position at which the supply unit 90 can feed it.

It is preferred that the storage unit 10 have a positioning mechanism (positioner) 12 that adjusts a storage position of the cardboard sheets Z. The positioning mechanism 12 has, for example, a pair of tabular members 12*a* arranged side by side an interval apart from each other to the left and right. The cardboard sheets Z accommodated in the storage unit 10 are disposed between the pair of tabular members 12*a*. Each of the pair of tabular members 12*a* is a member that can move in the left and right direction independently of the other tabular member 12*a*. The tabular member 12*a* on the right side among the pair of tabular members 12*a* regulates the right-side position of the cardboard sheets Z, and the tabular member 12*a* on the left side among the pair of tabular members 12*a* regulates the left-side position of the cardboard sheets Z.

The effect obtained by the storage unit 10 having the positioning mechanism 12 will be described.

The cardboard sheets Z placed in the storage unit 10 are moved upward by the supply unit 90 and supplied to the box forming unit 20. At this time, the supply unit 90 may move the cardboard sheets Z in the front and rear direction but does not move them in the right and left direction. For that reason, the cardboard sheets Z accommodated in the storage unit 10 are supplied to the box forming unit 20 without their position in the left and right direction being changed.

The box forming unit 20 opens the cardboard sheet Z by holding the first side surface S1 and the second side surface S2 of the cardboard sheet Z and bending the cardboard box Z at the boundary (called a boundary X) between the first side surface S1 and the second side surface S2. In the box forming apparatus 100 of this embodiment, when the box forming unit 20 receives the cardboard sheet Z from the supply unit 90, the position of later-described first holding units 42 of the box forming unit 20 that hold the first side surface 51 and the position of later-described second holding units 44 of the box forming unit 20 that hold the second side surface S2 do not change.

In a case where the left end (or right end) position of the cardboard sheets Z placed in the storage unit 10 is not changed when the size of the cardboard sheets Z handled by the box forming apparatus 100, the position of the boundary X between the first side surface 51 and the second side surface S2 may change. In this case, the box forming unit 20 may not be able to hold with the holding units 42, 44 the first side surface 51 and the second side surface S2 at appropriate positions and may not be able to properly bend the cardboard sheet Z at the boundary X, thus running the risk that problems such as the cardboard sheet Z being damaged or deformed will occur.

By contrast, here, as the storage unit 10 has the positioning mechanism 12, the boundary X can be positioned in the same position by adjusting the positions of the tabular members 12*a* in the left and right direction no matter the size of the cardboard sheets Z (see FIG. 4A and FIG. 4B). As a result, the occurrence of damage and deformation in the cardboard sheet Z can be inhibited.

The tabular members 12*a* may be members that are manually moved or members that are moved by a machine such as a motor. Furthermore, in a case where the tabular members 12*a* are moved by a motor or the like, when information relating to the size of the cardboard sheets Z is input to the controller 400 via an input unit (not shown in the drawings), the controller 40 may automatically adjust the positions of the tabular members 12*a* in conformity with the size of the cardboard sheets Z. The information relating to the size of the cardboard sheets Z is, for example, information about the size itself of the cardboard sheets Z. Furthermore, in a case where types of the cardboard sheets Z (codes identifying types of the cardboard sheets Z) and information about the appropriate positions of the tabular members 12*a* are associated with each other and stored in the storage device of the controller 400, the information relating to the size of the cardboard sheets Z may be information relating to the type of the cardboard sheets Z.

(3-2) Supply Unit

The supply unit (supplier) 90 supplies to the supply position the cardboard sheet Z accommodated in the storage unit 10. The supply position is a position at which the box forming unit 20 receives the cardboard sheet Z supplied by the supply unit 90.

The supply unit 90 mainly has a lift mechanism 92, holding suckers 94, and a suction mechanism 98 (see FIG. 3, FIG. 6, and FIG. 7).

The lift mechanism 92 holds with suckers 92*a* a side surface (at least one of the first side surface S1 and the second side surface S2) on the front side of the foremost cardboard sheet Z in the storage unit 10 (see FIG. 3). The lift mechanism 92 feeds upward the foremost cardboard sheet Z in the storage unit 10 by moving a support unit 92*b* of the suckers 92*a* upward (see FIG. 3). The movement of the support unit 92*b* in the up and down direction is realized by, for example, an air cylinder or a motor (not shown in the drawings).

The holding suckers 94 are supported by a support member 96 (see FIG. 7). The holding suckers 94 suck hold of a side surface (at least one of the third side surface S3 and the fourth side surface S4) on the rear side of the cardboard sheet Z that the lift mechanism 92 is conveying to the supply position and hold the cardboard sheet Z in the supply position until the box forming unit 20 receives the cardboard sheet Z.

The suction mechanism 98 is a mechanism that applies a suction force to the suckers 92*a* and the holding suckers 94. Specifically, the suction mechanism 98 is, for example, a vacuum pump.

(3-3) Box Forming Unit

The box forming unit 20 opens the cardboard sheet Z that has been handed over from the supply unit 90 to form the square tubular cardboard box CB.

The box forming unit 20, as shown in FIG. 5 and FIG. 6, mainly includes first holding units (first holders) 42, second holding units (second holders) 44, a suction mechanism 46, an arm 50, a first moving unit (first mover) 60, and a second moving unit (second mover) 70.

(3-3-1) First Holding Units

The box forming unit 20 has two first holding units (first holders) 42 that hold the first side surface S1 of the cardboard sheet Z supplied by the supply unit 90. In this embodiment, the first holding units 42 are suckers. The first holding units 42 are supported by a first support unit (support) 52*a* of the arm 50.

It will be noted that the number of the first holding units 42 that the box forming unit 20 has is not limited to two and may be one or three or more. It suffices for the number of the first holding units 42 to just be a number appropriate for holding the first side surface S1.

In this embodiment, the two first holding units 42 are disposed at the same height in the vertical direction and apart from each other in the horizontal direction. In other words, the first support unit 52*a* of the arm 50 supports the two first holding units 42 in a state in which they are at the same height in the vertical direction and apart from each other in the horizontal direction. However, the arrangement of the first holding units 42 is not limited to this arrangement. For example, the two first holding units 42 may also be disposed at mutually different heights in the vertical direction and in the same positions in the horizontal direction.

(3-3-2) Second Holding Units

The box forming unit 20 has two second holding units (second holder) 44 that hold the second side surface S2 of the cardboard sheet Z supplied by the supply unit 90. In this embodiment, the second holding units 44 are suckers. The second holding units 44 are supported by a second support unit 52*b* of the arm 50.

It will be noted that the number of the second holding units 44 that the box forming unit 20 has is not limited to two and may be one or three or more. It suffices for the number of the second holding units 44 to just be a number appropriate for holding the second side surface S2.

In this embodiment, the two second holding units 44 are disposed at the same height in the vertical direction and apart from each other in the horizontal direction. In other words, the second support unit 52*b* of the arm 50 supports the two second holding units 44 in a state in which they are at the same height in the vertical direction and apart from each other in the horizontal direction. However, the arrangement of the second holding units 44 is not limited to this arrangement. For example, the two second holding units 44 may also be disposed at mutually different heights in the vertical direction and in the same positions in the horizontal direction.

Moreover, here, although the number of the second holding units 44 and the number of the first holding units 42 are the same, the number of the second holding units 44 and the number of the first holding units 42 are not limited to this and may also be mutually different.

(3-3-3) Suction Mechanism

The suction mechanism 46 is a mechanism that applies suction force to the first holding units 42 and the second holding units 44. Specifically, the suction mechanism 46 is, for example, a vacuum pump.

(3-3-4) Arm

The arm 50 is used when opening the cardboard sheet Z.

The arm 50 may be a single member or a member formed by combining plural members.

The arm 50 is rotatably supported by a rotating shaft 50*a*. In this embodiment, the rotating shaft 50*a* extends in the vertical direction. The arm 50 rotates about a rotational center O.

The arm 50 is a bar-shaped member that extends from an end portion 53 near the rotating shaft 50*a* to a distal end 51 disposed in a position away from the rotating shaft 50*a*. Below, the direction extending from the end portion 53 to the distal end 51 will sometimes be called the lengthwise direction of the arm 50.

The arm 50 has a support unit (support) 52 that supports the first holding units 42 and the second holding units 44 (see FIG. 3). The support unit 52 includes the first support unit 52*a* that supports the first holding units 42 and the second support unit 52*b* that supports the second holding units 44. It will be noted that the first holding units 42 are attached to a linkage 64 that is attached to the arm 50. In other words, the first support unit 52*a* supports the first holding units 42 via the linkage 64 that is attached to the arm 50. The second support unit 52*b* supports the second holding units 44 directly (i.e., without the intervention of a link mechanism).

When the first holding units 42 and the second holding units 44 receive from the supply unit 90 the cardboard sheet Z supplied to the supply position, the arm 50 extends such that its lengthwise direction coincides with the left and right direction. Furthermore, the first holding units 42 and the second holding units 44 supported by the arm 50 are disposed side by side in a straight line in the left and right direction (see the first holding units 42 and the second holding units 44 shown by the solid lines in FIG. 5). Furthermore, when the first holding units 42 and the second holding units 44 receive from the supply unit 90 the cardboard sheet Z supplied to the supply position, the first holding units 42 are disposed on the left side of the second holding units 44 in conformity with the arrangement of the first side surface S1 and the second side surface S2 of the cardboard sheet Z in the supply position.

When the arm 50 starts rotating, as described later, the position of the first holding units 42 relative to the second holding units 44 changes, so that the direction in which the two first holding units 42 form a line and the direction in which the two second holding units 44 form a line come to intersect each other (see FIG. 8). It will be noted that in this embodiment, when opening the cardboard sheet Z, the arm 50 rotates counterclockwise in plan view. At the point in time when the arm 50 has rotated 90° about the rotational center O and the opening of the cardboard sheet Z is completed, the direction in which the two first holding units 42 form a line and the direction in which the two second holding units 44 form a line become orthogonal to each other (see the first holding units 42 and the second holding units 44 shown by the dashed lines in FIG. 5).

(3-3-5) First Moving Unit

The first moving unit (first mover) 60 changes the position of the first holding units 42 relative to the second holding units 44 while rotating the arm 50 to open the cardboard sheet Z.

The first moving unit 60, as shown in FIG. 5 and FIG. 6, mainly has a first drive mechanism (actuator) 62 and the linkage (link mechanism) 64.

The first drive mechanism 62 rotates the arm 50. The first drive mechanism 62 is, for example, an air cylinder or a motor.

The linkage 64 changes the position of the first holding units 42 relative to the second holding units 44 in accompaniment with the rotation of the arm 50. In other words, the linkage 64 is simultaneously driven by the first drive mechanism 62 that rotates the arm 50 to change the position of the first holding units 42 relative to the second holding units 44.

The linkage 64 includes plural links 64*a*, a fixed end 64*b* that connects some of the links 64*a* to the arm 50, and joints 64*c* that interconnect the links 64*a* (see FIG. 5). The first holding units 42 are attached to a first link 64*a*1 that is one of the links 64*a*. The links 64*a* connected to the arm 50 by the fixed end 64*b* are rotatable about the fixed end 64*b* but do not move away from the arm 50.

The linkage 64 changes the position of the first holding units 42, which are attached to the first link 64*a*1, relative to the second holding units 44 so that the first side surface 51 held by the first holding units 42 rotates about the boundary X between the first side surface 51 and the second side surface S2 with respect to the second side surface S2 held by the second holding units 44 in accompaniment with the rotation of the arm 50 (see FIG. 7, FIG. 8, and FIG. 10). When the arm 50 rotates 90° about the rotational center O from the state in which the lengthwise direction of the arm 50 coincides with the left and right direction (the state in which the arm 50 is disposed when the first holding units 42 and the second holding units 44 receive from the supply unit 90 the cardboard sheet Z supplied to the supply position; hereinafter, sometimes called "the initial state") to the state in which the lengthwise direction of the arm 50 coincides with the front and rear direction, the first side surface S1 held by the first holding units 42 and the second side surface S2 held by the second holding units 44 become orthogonal to each other, and the opening of the cardboard sheet Z by the first moving unit 60 is completed (see FIG. 10).

(3-3-6) Second Moving Unit

The second moving unit (second mover) 70 moves the arm 50 in a case where the cardboard sheet Z is opened. More specifically, the second moving unit 70 moves the entire arm 50 with respect to a frame 80 of the box forming and packing system 1 in a case where the cardboard sheet Z is opened. The second moving unit 70 moves the arm 50 so that, at the point in time when the opening of the cardboard sheet Z is completed, the second moving unit 70 has moved the support unit 52 a predetermined distance L in a second direction D2 opposite a first direction D1 compared with the case where the second moving unit 70 does not move the arm 50. The first direction D1 is a direction heading from the rotational center O of the arm 50 to the distal end 51 of the arm 50 at the point in time when the opening of the cardboard sheet Z is completed. In other words, the first direction D1 is the lengthwise direction of the arm 50 at the point in time when the opening of the cardboard sheet Z is completed. In other words, at the point in time when the arm 50 has rotated 90° about the rotational center O from the initial state, the second moving unit 70 has moved the support unit 52 the predetermined distance L in the second direction D2 (rearward) opposite the first direction D1 (forward) which is a direction heading from the rotational center O of the arm 50 to the distal end 51 of the arm 50. In this embodiment, the second moving unit 70 specifically moves the rotational center O of the arm 50 (the rotating shaft 50*a* that rotatably supports the arm 50) in the second direction D2.

The second moving unit 70, as shown in FIG. 6 and FIG. 7, mainly has a support member 74, which supports the rotating shaft 50*a* of the arm 50, and a second drive mechanism 72.

The second drive mechanism 72 is, for example, an air cylinder or a motor.

The support member 74 is a member supported by the frame 80, which extends in the front and rear direction of the box forming and packing system 1, in a state in which the support member 74 is movable in the front and rear direction with respect to the frame 80. The support member 74 is driven by the second drive mechanism 72 to move in the front and rear direction along the frame 80. Specifically, the support member 74 is movable between a first position P1 (see the position of the support member 74 shown by the dashed line in FIG. 10) and a second position P2 (see the position of the support member 74 shown by the solid line in FIG. 10).

When the arm 50 extends in the left and right direction (when the arm 50 is in the initial state) and the first holding units 42 and the second holding units 44 receive the cardboard sheet Z supplied to the supply position, the support member 74 is disposed in the first position P1. By contrast, at the point in time when the arm 50 has rotated 90° about the rotational center O and the opening of the cardboard sheet Z is completed, the support member 74 is disposed in the second position P2. Because the support member 74 moves in the second direction D2 (rearward) from the first position P1 to the second position P2, at the point in time when the opening of the cardboard sheet Z is completed, the support unit 52 of the arm 50 has moved the predetermined distance L in the second direction D2 compared with a case where the support member 74 does not move in the second direction D2 (a case where the support member 74 is immovable in the first position P1). In other words, as shown in FIG. 10, because the support member 74 moves in the second direction D2 from the first position P1 to the second position P2, at the point in time when the opening of the cardboard sheet Z is completed, the first holding units 42 and the second holding units 44 have moved the predetermined distance L in the second direction D2 compared with a case where the support member 74 does not move in the second direction D2 (see and compare 1) the positions of the first holding units 42 and the second holding units 44 shown by the dashed lines in FIG. 10 for a (comparative) case in which the support member 74 does not move in the second direction D2 and 2) the positions of the first holding units 42 and the second holding units 44 shown by the solid lines in FIG. 10 for a case in which the support member 74 has moved to the second position P2). In still other words, because the support member 74 moves in the second direction D2 from the first position P1 to the second position P2, at the point in time when the opening of the cardboard sheet Z is completed, the cardboard sheet Z (i.e., the now-opened cardboard box DB) has moved the predetermined distance L in the second direction D2 compared with a case where the support member 74 does not move in the second direction D2. It will be noted that, in FIG. 10, at the point in time when the opening of the cardboard sheet Z is completed, the rear end of the cardboard sheet Z (i.e., the now-opened cardboard box CB) is positioned forward of the supply position to which the supply unit 90 supplies the cardboard sheet Z. However, the position of the rear end of the cardboard sheet Z is not limited to this, and at the point in time when the opening of the cardboard sheet Z is completed the rear end of the cardboard sheet Z (the opened cardboard box CB) may also be positioned rearward of the supply position to which the supply unit 90 supplies the cardboard sheet Z.

The effects obtained by the presence of the second moving unit 70 will now be described (see the position of the cardboard box CB shown by the dashed line in FIG. 10 in a comparative case where the support member 74 does not move in the second direction D2 and the position of the cardboard box CB shown by the solid line in FIG. 10 in a case where the support member 74 has moved to the second position P2).

First, problems in a case supposing that the box forming apparatus 100 does not have the second moving unit 70 will be described with reference to FIG. 9.

Before the arm 50 starts opening the cardboard sheet Z (when the arm 50 is in the initial state), the arm 50 extends in the left and right direction as in FIG. 7. By contrast, when the arm 50 rotates about the rotational center O extending in the vertical direction, the distal end 51 of the arm 50 gradually moves forward. Furthermore, the cardboard sheet Z that is opened by the arm 50 also gradually moves forward (see FIG. 8). Then, at the point in time when the arm 50 has rotated 90° about the rotational center O extending in the vertical direction and the opening of the cardboard sheet Z is completed, the arm 50 extends forward from the rotational center O (see FIG. 9). Furthermore, the opened cardboard box CB has moved forward from the view of the supply position of the cardboard sheet Z. If the second moving unit 70 were not present, the position of the rotational center O would not change, so, as in FIG. 9, the cardboard box CB would have moved a large amount forward from the view of the supply position of the cardboard sheet Z. Members configuring the box forming apparatus 100 and members configuring the box forming and packing system 1 (members other than the members configuring the box forming apparatus 100) cannot be disposed in the space in which the arm 50 and the cardboard sheet Z (the cardboard box CB) move. Consequently, in a case where the box forming apparatus 100 does not have the second moving unit 70, the sizes of the box forming apparatus 100 and the box forming and packing system 1 in the front and rear direction tend to increase.

By contrast, the second moving unit 70 moves the arm 50 by moving the support member 74, and at the point in time when the opening of the cardboard box Z is completed, the second moving unit 70 has moved the support unit 52 of the arm 50 the predetermined distance L in the second direction D2 compared to a case where the second moving unit 70 has not moved the arm 50, so the space in which the arm 50 and the cardboard sheet Z (the now-opened cardboard box CB) move can be reduced (see FIG. 10). As a result, an increase in the sizes of the box forming apparatus 100 and the box forming and packing system 1 in the front and rear direction can be inhibited.

It will be noted that although FIG. 8 shows a state in which the support member 74 is in the first position P1, even if the second moving unit 70 moves the arm 50 after the rotation of the arm 50 has ended, the space in which the arm 50 and the cardboard sheet Z (the cardboard box CB) move cannot be reduced. For that reason, the controller 400 controls the operation of the second moving unit 70 so that the second moving unit 70 starts moving the support member 74 while the arm 50 is rotating. For example, the controller 400 may control the operation of the second drive mechanism 72 to move the support member 74 rearward from the first position P1 at the stage when the arm 50 is in a rotational state such as shown in FIG. 8.

However, if the second drive mechanism 72 moves the support member 74 to the second position P2 at a timing that is too soon, the arm 50 and the cardboard sheet Z run the risk of coming into contact with members disposed rearward of them (e.g., the support member 96 of the supply unit 90). For that reason, the controller 400 controls the second drive mechanism 72 to move the support member 74 at a predetermined timing so that, while the support member 74 is moving from the first position P1 to the second position P2, the arm 50 and the cardboard sheet Z do not come into contact with members disposed rearward of them. It will be noted that the second drive mechanism 72 may move the support member 74 at a generally constant moving speed from the first position P1 to the second position P2 or may change the moving speed midway. Furthermore, the second drive mechanism 72 may move the support member 74 continuously from the first position P1 to the second position P2 or may move the support member 74 discontinuously so as to temporarily stop midway.

It will be noted that the box forming apparatus 100 does not always handle cardboard sheets Z (cardboard boxes CB) of the same size, and sometimes the size of the cardboard sheets Z that the box forming apparatus 100 handles changes. In a case supposing that the box forming apparatus 100 does not have the moving unit 70 as in FIG. 9, the position that the opened cardboard sheet Z (the cardboard box CB) reaches in the forward direction with respect to the supply position to which the supply unit 90 supplies the cardboard sheet Z differs depending on the size of the cardboard sheet Z (the cardboard box CB). If, for example, the size of the cardboard sheet Z (the cardboard box CB) is relatively small, the opened cardboard sheet Z might not come into contact with members configuring the box forming apparatus 100 or members configuring the box packing and forming system 1 (members other than the members configuring the box forming apparatus 100) even if the support member 74 is not moved rearward or even if the moving amount of the support member 74 in the rearward direction is relatively small. In such a case, if the support member were also moved a large amount rearward, the rearward movement of the support member 74 would become pointless because in this embodiment the opened cardboard box CB is eventually moved forward to where the goods handling area GHA is, and so the rearward movement of the support member 74 might lead to a reduction in the efficiency of the box forming and packing system 1.

Thus, it is preferred that the box forming apparatus 100 have a changing unit (Changer) that can change the predetermined distance L the second moving unit 70 moves the support unit 52 of the arm 50. In other words, it is preferred that the box forming apparatus 100 have a changing unit that can change the second position P2. It will be noted that, here, the expression “can change the predetermined distance L” may also include an aspect that makes the predetermined distance L zero.

The changing unit may, as indicated by reference sign “410” in FIG. 6, be a unit that the controller 400 has. The changing unit 410 of the controller 400 changes the moving distance of the support unit 52 (in other words, the moving distance of the support member 74) by, for example, changing the control content of a motor serving as the second drive mechanism 72.

Furthermore, the changing unit may, instead of being a unit that the controller 400 has, be a mechanism that physically changes (limits) the moving range of the support member 74. For example, as indicated by reference sign "72*a*" in FIG. 6, the second drive mechanism 72 may have the changing unit. The changing unit 72*a* here is, for example, a stroke adjusting mechanism that changes the stroke of an air cylinder serving as the second drive mechanism 72.

(4) Characteristics 4-1

The box forming apparatus 100 opens the collapsed cardboard sheet Z in which the first side surface S1 and the second side surface S2 oppose the third side surface S3 and the fourth side surface S4 to form the square tubular cardboard box CB in which the first side surface S1, the second side surface S2, the third side surface S3, and the fourth side surface S4 are consecutive in this order. The box forming apparatus 100 includes the first holding units (first holder) 42, the second holding units (second holder) 44, the arm 50, the first moving unit (first mover) 60, and the second moving unit (second mover) 70. The first holding units 42 hold the first side surface S1 of the cardboard sheet Z. The second holding units 44 hold the second side surface S2 of the cardboard sheet Z. The arm 50 has the support unit (support) 52 that supports the first holding units 42 and the second holding units 44. The arm 50 rotates about the rotational center O. The first moving unit 60 changes a position of the first holding units 42 relative to the second holding units 44 while rotating the arm 50 to open the cardboard sheet Z. The second moving unit 70 moves the support unit 52 or the arm 50 in association with the opening of the cardboard sheet Z. The second moving unit 70 moves the support unit 52 or the arm 50 so that, at the point in time when the opening of the cardboard sheet Z is completed, the second moving unit 70 has moved the support unit 52 the predetermined distance L in the second direction D2 opposite the first direction D1 compared with a case where the second moving unit 70 does not move the support unit 52 or the arm 50. The first direction D1 is a direction heading from the rotational center O of the arm 50 to the distal end 51 of the arm 50 at the point in time when the opening of the cardboard sheet Z is completed. In the above embodiment, the first direction D1 is forward and the second direction D2 is rearward.

In particular, in the box forming apparatus 100, the second moving unit 70 moves the rotational center O of the arm 50 in the second direction D2.

In the box forming apparatus 100, the second moving unit 70 moves the support unit 52 or the arm 50 so that, at the point in time when the opening of the cardboard sheet Z is completed, the support unit 52 has been moved in the second direction D2 compared with a case where the second moving unit 70 does not move the support unit 52 or the arm 50. As a result, moving space for the arm 50 and the cardboard sheet Z held by the holding units 42, 44 can be ensured while reducing the length of the box forming apparatus in the first direction D1.

In particular, in the box forming apparatus 100 of the above embodiment, the rotational center O of the arm 50 is moved in the second direction D2 in in association with rotating the arm 50 to open the cardboard sheet Z. Because the box forming apparatus 100 is configured in this way, with relatively simple structure, moving space for the arm 50 and the cardboard sheet held by the holding units 42, 44 can be ensured while reducing the length of the box forming apparatus 100 in the first direction D1.

4-2

In the box forming apparatus 100, the first moving unit 60 has the first drive mechanism 62 that rotates the arm 50 and the linkage 64 that changes the position of the first holding units 42 relative to the second holding units 44 in accompaniment with the rotation of the arm 50. The first drive mechanism 62 is an example of an actuator.

In the box forming apparatus 100, the position of the first holding units 42 relative to the second holding units 44 is changed by the linkage 64 in conjunction with the rotation of the arm 50. For that reason, the rotation of the arm 50 and the changing of the position of the first holding units 42 relative to the second holding units 44 can be realized with a single drive mechanism.

Furthermore, in the box forming apparatus 100, the timing of the rotation of the arm 50 and the timing of the changing of the position of the first holding units 42 relative to the second holding units 44 can be synchronized. Therefore, the occurrence of deformation and damage in the cardboard box CB that the box forming apparatus 100 opens can be inhibited.

4-3

The box forming apparatus 100 includes the storage unit (storage) 10 and the supply unit (supplier) 90. The storage unit 10 stores the cardboard sheet Z. The supply unit 90 supplies to the supply position the cardboard sheet Z placed in the storage unit 10. The storage unit 10 has the positioning mechanism (positioner) 12 that adjusts the storage position of the cardboard sheet Z.

In this box forming apparatus 100, the cardboard sheet Z can be supplied to the supply position so that the position of the boundary X between the first side surface S1 and the second side surface S2 (in other words, the position at which the cardboard sheet Z is bent) is always in the same position even when the size of the cardboard sheet Z changes. For that reason, in this box forming apparatus 100, even when the size of the cardboard sheet Z changes, it is not necessary to adjust the positions of various constituent parts in the mechanisms for box forming, and operability is therefore good. Furthermore, a configuration or structure for adjusting the positions of various constituent parts in the mechanisms for box forming, which are constituently complex, is not required, so an increase in the cost of the box forming apparatus 100 can also be inhibited.

4-4

The box forming apparatus 100 further includes a changing unit (Changer) that changes the predetermined distance L (the moving amount in which the second moving unit 70 moves the support unit 52).

The changing unit may, as indicated by reference sign "410" in FIG. 6, be a unit that the controller 400 has, and the changing unit 410 may change the control content of a motor serving as the second drive mechanism 72. Furthermore, the changing unit may, as indicated by reference sign "72*a*" in FIG. 6, be a unit that the second drive mechanism 72 has. The changing unit 72*a* in this box is, for example, a stroke adjusting mechanism that changes the stroke of an air cylinder serving as the second drive mechanism 72.

In the box forming apparatus 100, the occurrence of a situation where the second moving unit 70 moves the support unit 52 of the arm 50 an unnecessarily large amount in the second direction D2 can be inhibited. Furthermore, in the box forming apparatus 100, the occurrence of a converse situation where the moving amount of the support unit 52 of the arm 50 in the second direction D2 is not enough can also be inhibited.

4-5

The box forming and packing system 1 includes the box forming apparatus 100, the bottom lid forming unit 200 serving as an example of a forming device, and the packing unit 300 serving as an example of a packing apparatus. The bottom lid forming unit 200 forms the bottom lid B in the cardboard box CB that has been opened by the box forming apparatus 100. The packing unit 300 packs the goods G in the cardboard box CB in which the bottom lid B has been formed.

In the box forming and packing system 1, an increase in the size of the box forming apparatus 100 can be inhibited, so an increase in the size of the box forming and packing system 1 overall can be inhibited.

(5) Example Modifications

Example modifications of the above embodiment will now be described. It will be noted that description regarding a given example modification may be appropriately combined where not contradictory with description regarding another example modification and applied to the above embodiment.

(5-1) Example Modification A

In the above embodiment, the box forming apparatus 100 includes in its configuration the storage unit 10, the supply unit 90, and the box forming unit 20, but the box forming apparatus 100 is not limited to this.

For example, the box forming apparatus 100 may also include in its configuration the bottom lid forming unit 200 in addition to the storage unit 10, the supply unit 90, and the box forming unit 20. Additionally, rather than functioning as part of the box forming and packing system 1, the box forming apparatus 100 may be an apparatus that is independent of the packing apparatus and forms from the cardboard sheet Z the cardboard box CB in which the bottom lid B is formed. Additionally, the cardboard box CB formed by the box forming apparatus 100 may be supplied by a conveyor or a robot (not shown in the drawings), for example, to a location that requires the cardboard box CB.

(5-2) Example Modification B

The box forming and packing system 1 of the above embodiment is merely an embodiment, and various changes may be made thereto. For example, the packing apparatus of the box forming and packing system 1 may be an apparatus that puts the goods G from above into the cardboard box CB in which the opening not closed by the flaps Fa faces upward. In a case where the packing apparatus is configured in this way, the first orientation changing unit 510 and the second orientation changing unit 540 that change the orientation of the cardboard box CB are unnecessary.

(5-3) Example Modification C

The second moving unit 70 of the box forming apparatus 100 of the above embodiment moves the rotational center O of the arm 50 by moving the support member 74 rearward. However, the second moving unit 70 is not limited to this and need not move the rotational center O of the arm 50.

Figure 11:
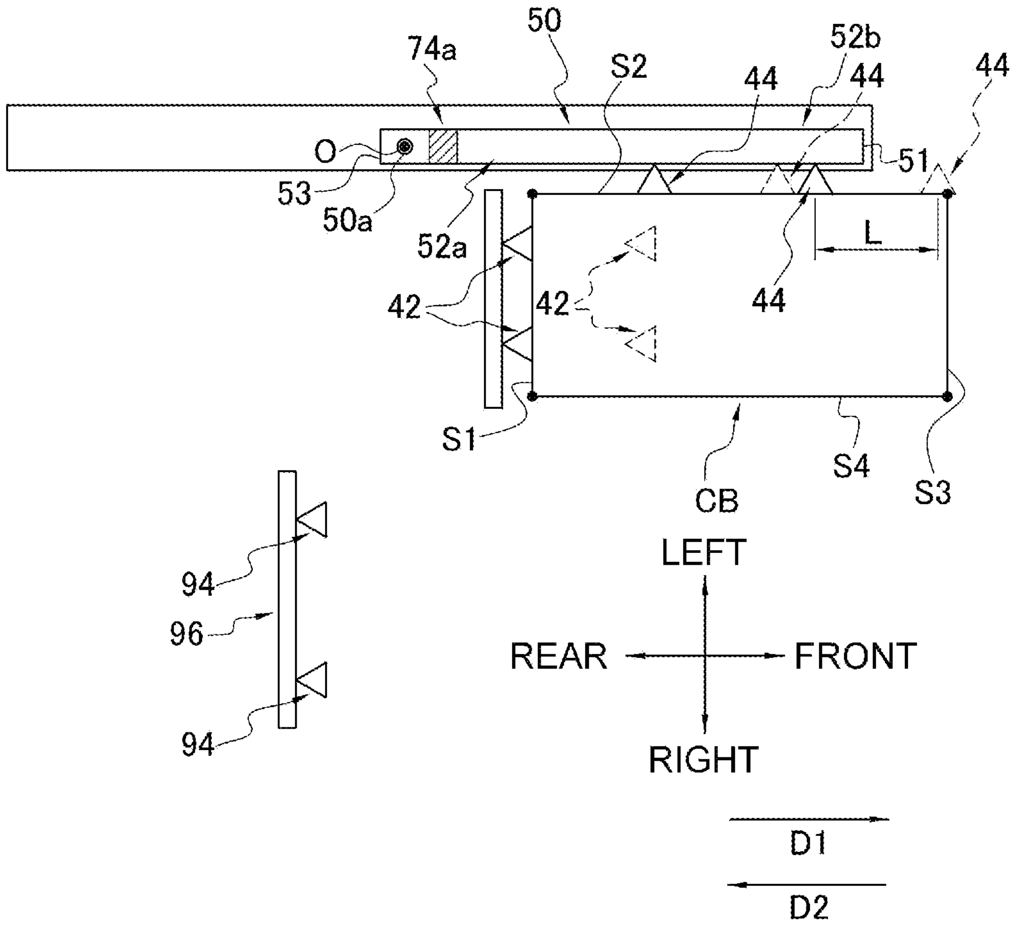
FIG. 11 is a schematic plan view showing the state of main portions of the box forming apparatus when the operation of opening the cardboard sheet performed by the box forming apparatus according to example modification C is completed.

For example, as in FIG. 11, the rotating shaft 50*a* of the arm 50 may be directly attached to the frame 80 without the box forming apparatus 100 being provided with the support member 74. Here, in contrast to the above embodiment, the rotating shaft 50*a* of the arm 50 does not move forward and rearward. Additionally, to make up for the box forming apparatus 100 not having the support member 74, the arm 50 is provided with a telescoping unit 74*a* that extends and retracts along the lengthwise direction of the arm 50, and the telescoping unit 74*a* functions as part of the second moving unit 70.

This will be described more specifically. The second moving unit 70 in the box forming apparatus 100 of example modification C includes the telescoping unit 74*a* provided in the arm 50 and the second drive mechanism 72. The second drive mechanism 72 is, for example, an air cylinder or a motor as in the above embodiment. However, here, the second drive mechanism 72 is used to drive the telescoping unit 74*a* instead of driving the support member 74. The telescoping unit 74*a* is, for example, a rod having a telescope structure provided nearer the rotating shaft 50*a* than the support unit 52 of the arm 50. Specifically, the telescoping unit 74*a* has a rod that is driven in the lengthwise direction of the arm 50 by the second drive mechanism 72 and a hollow rod that can accommodate this rod inside. When the rod driven by the second drive mechanism 72 is moved in the lengthwise direction of the arm 50 and enters or exits the hollow rod, the support unit 52 of the arm 50 moves toward or away from the rotating shaft 50*a* of the arm along the lengthwise direction of the arm 50.

In this way, the second moving unit 70 may move the support unit 52 without changing the position of the rotational center O of the arm 50 in a case where the opening of the cardboard sheet Z. The second moving unit 70 moves the support unit 52 so that, at the point in time when the opening of the cardboard sheet Z is completed, the second moving unit 70 has moved the support unit 52 the predetermined distance L in the second direction D2 opposite the first direction D1 compared with a case where the second moving unit 70 has not moved the support unit 52. In other words, the second moving unit 70 moves the support unit 52 so that, the second moving unit 70 moves the first holding units 42 and the second holding units 44 the predetermined distance L compared with a case where the second moving unit 70 has not moved the support unit 52 (see and compare 1) the first holding units 42 and the second holding units 44 shown by the dashed lines (a comparative case where the second moving unit 70 has not moved the support unit 52) and 2) the first holding units 42 and the second holding units 44 shown by the solid lines (a case where the second moving unit 70 has moved the support unit 52)).

Even in a case where the second moving unit 70 is configured as in example modification C, the length of the box forming apparatus 100 in the first direction D1 can be reduced, and moving space for the cardboard sheet Z held by the first holding units 42 and the second holding units 44 can be ensured.

(5-4) Example Modification D

The box forming apparatus 100 of the above embodiment rotates the arm 50 about the rotational center O extending in the vertical direction to open the cardboard sheet Z that the supply unit 90 supplies to the supply position in a state in which the first side surface S1 is disposed on the left side and the second side surface S2 is disposed on the right side. However, the box forming apparatus 100 is not limited to this.

Figure 12:
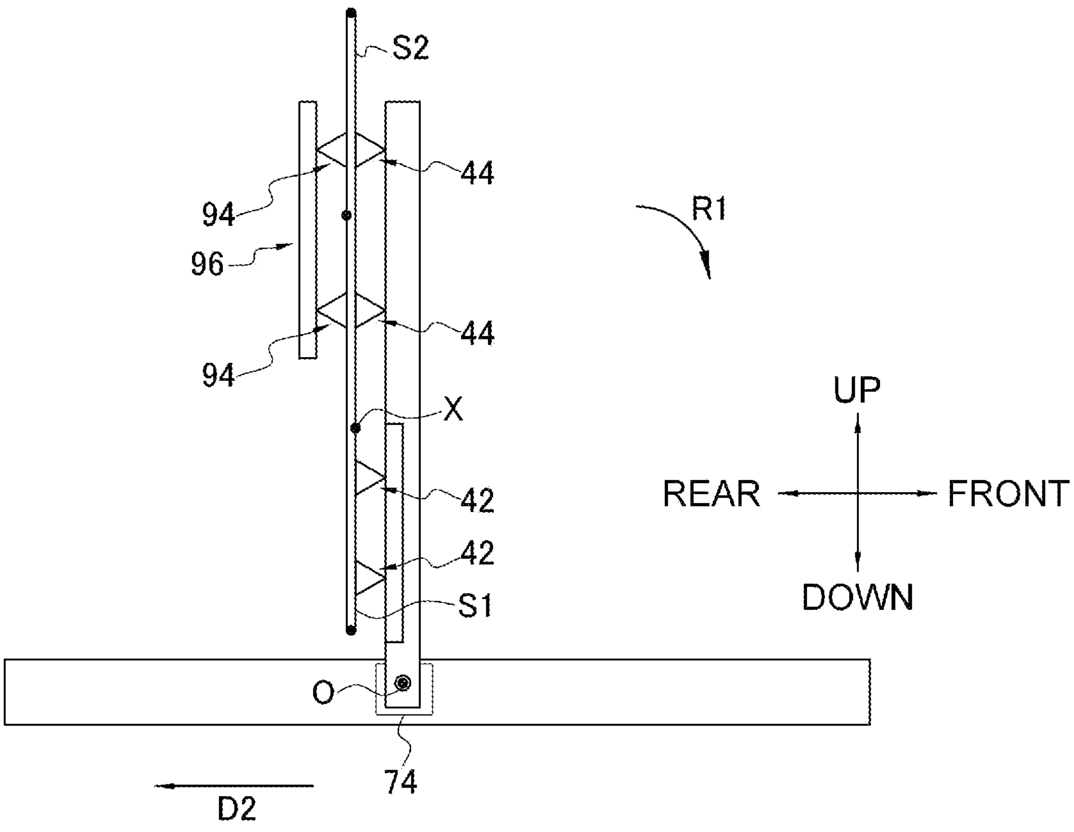
FIG. 12 is a schematic right side view of main portions of the box forming apparatus of one form according to example modification D.

For example, as shown in FIG. 12, the box forming apparatus 100 may also rotate the arm 50 about the rotational center O extending in the left and right direction (see arrow R1 in the drawing) to open the cardboard sheet Z that the supply unit 90 supplies to the supply position in a state in which the first side surface S1 is disposed on bottom and the second side surface S2 is disposed on top. In this case, the second moving unit 70 moves the support unit 52 or the arm 50 so that, at the point in time when the opening of the cardboard sheet Z is completed, the second moving unit 70 has moved the support unit 52 a predetermined distance rearward (the second direction D2) compared with a case where the second moving unit 70 has not moved the support unit 52 or the arm 50.

Figure 13:
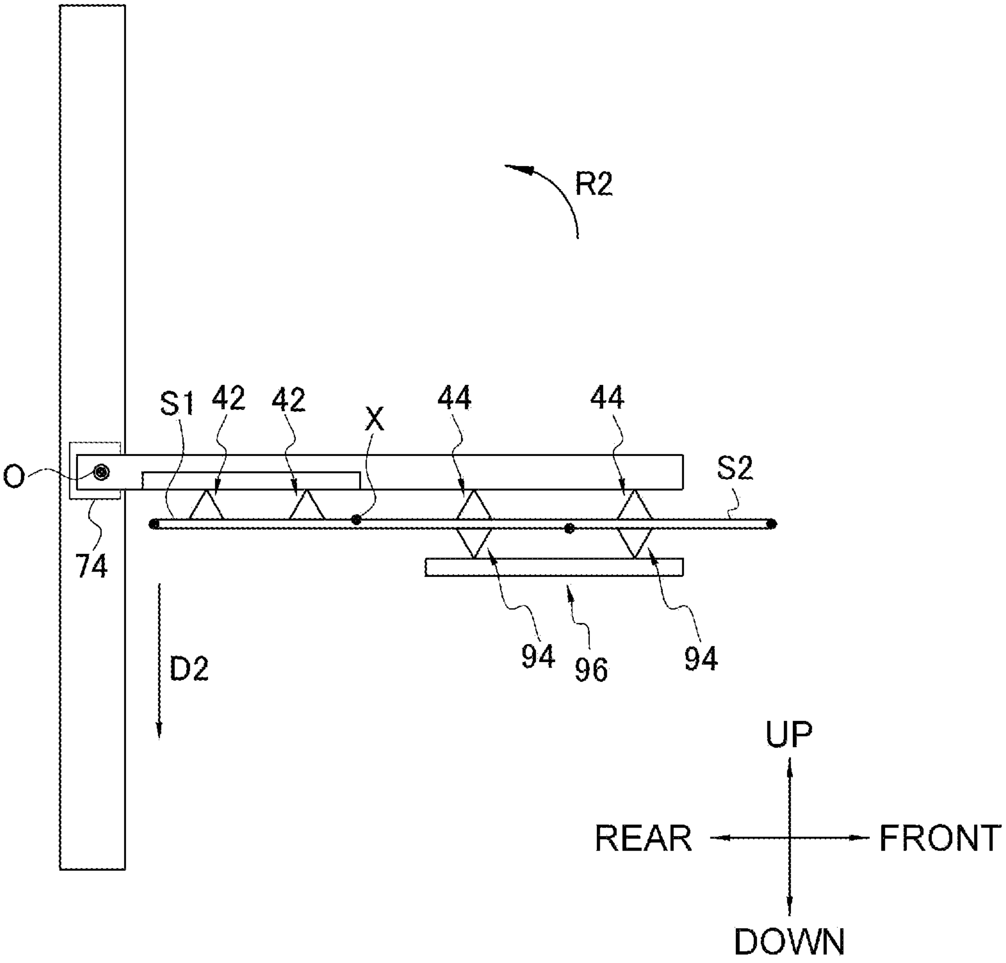
FIG. 13 is a schematic right side view of main portions of the box forming apparatus of another form according to example modification D.

Furthermore, for example, as shown in FIG. 13, the box forming apparatus 100 may also rotate the arm 50 about the rotational center O extending in the left and right direction (see arrow R2 in the drawing) to open the cardboard sheet Z in a horizontal state supplied to the supply position in a state in which the first side surface S1 is disposed in back and the second side surface S2 is disposed in front. In this case, the second moving unit 70 moves the support unit 52 or the arm 50 so that, at the point in time when the opening of the cardboard sheet Z is completed, the second moving unit 70 has moved the support unit 52 a predetermined distance downward and rearward (the second direction D2) compared with a case where the second moving unit 70 has not moved the support unit 52 or the arm 50. When the box forming apparatus 100 is configured in this way, the height of the box forming apparatus 100 can be reduced.

(5-5) Example Modification E

In the above embodiment, the linkage 64 that changes the position of the first holding units 42 relative to the second holding units 44 is also driven by the first drive mechanism 62 that rotates the arm. However, the first moving unit 60 is not limited to this and may also have a drive mechanism separate from the first drive mechanism 62 and a mechanism that is driven by this drive mechanism to change the position of the first holding units 42 relative to the second holding units 44.

INDUSTRIAL APPLICABILITY

The present invention is widely applicable to box forming apparatus and box forming and packing systems having a box forming apparatus, and is thus useful.

REFERENCE SIGNS LIST

1 Box forming and Packing System
10 Storage Unit (Storage Area)
12 Positioning mechanism (Positioner)
42 First Holding Units (First Holders)
44 Second Holding Units (Second Holders)
50 Arm
51 Distal End
52 Support Unit (Support)
52*a* First Support Unit (Support)
52*b* Second Support Unit (Support)
60 First Moving Unit (First Mover)
62 First Drive mechanism (Actuator)
64 Link mechanism (Linkage)
70 Second Moving Unit (Second Mover)
72*a* Changing unit (Changer)
90 Supply Unit (Supplier)
100 Box forming Apparatus
200 Bottom Lid Forming Unit (Forming Device)
300 Packing Unit (Packing Apparatus)
410 Changing unit (Changer)
B Bottom Lid
CB Cardboard Box
D1 First Direction
D2 Second Direction
L Predetermined Distance
O Rotational Center
S1 First Side Surface
S2 Second Side Surface
S3 Third Side Surface
S4 Fourth Side Surface
Z Cardboard Sheet

CITATION LIST

Patent Literature

Patent Document 1: JP-A No. 2019-147582

What is claimed is:

1. A box forming apparatus that opens a collapsed cardboard sheet, in which a first side surface and a second side surface oppose a third side surface and a fourth side surface, to form a square tubular cardboard box in which the first side surface, the second side surface, the third side surface, and the fourth side surface are consecutive in this order, the box forming apparatus comprising:
- a first holder configured to hold the first side surface of the cardboard sheet;
- a second holder configured to hold the second side surface of the cardboard sheet;
- an arm having a support configured to support the first holder and the second holder, the arm configured to rotate about a rotational center;
- a first mover configured to change a position of the first holder relative to the second holder while the arm is being rotated to open the cardboard sheet; and
- a second mover configured to move, in association with rotation of the arm to open the cardboard sheet, the support or the arm in a second direction opposite to a first direction, such that the support is moved in the second direction, when opening of the cardboard sheet is completed, by a predetermined distance relative to a position where the support would be disposed if the support or the arm were not moved by the second mover, the first direction being a direction heading from the rotational center of the arm to a distal end of the arm when the opening of the cardboard sheet is completed.

2. The box forming apparatus of claim 1, wherein
the second mover is configured to move the rotational center of the arm in the second direction.

3. The box forming apparatus of claim 1, wherein
the second mover is configured to move the support in the second direction.

4. The box forming apparatus of claim 1, wherein
the first mover has an actuator configured to rotate the arm and a linkage configured to change the position of the first holder relative to the second holder in accompaniment with a rotation of the arm.

5. The box forming apparatus of claim 1, further comprising a storage area configured to store a supply of cardboard sheets; and a supplier configured to supply each of the cardboard sheets in the storage area to a supply position, wherein the storage area has a positioner configured to adjust a storage position of the cardboard sheets.

6. The box forming apparatus of claim 1, further comprising a changer configured to change the predetermined distance.

7. A box forming and packing system comprising:

the box forming apparatus of claim 1;

a forming device configured to form a bottom lid in the cardboard box that has been opened by the box forming apparatus; and a packing apparatus configured to pack goods in the cardboard box in which the bottom lid has been formed.

* * * * *